United States Patent
Moenig et al.

(10) Patent No.: US 10,070,023 B2
(45) Date of Patent: Sep. 4, 2018

(54) CAMERA APPARATUS FOR A MOTOR VEHICLE

(71) Applicants: Stefan Moenig, Schwelm (DE); Igor Gorenzweig, Wuppertal (DE); Joerg Simon, Wuelfrath (DE)

(72) Inventors: Stefan Moenig, Schwelm (DE); Igor Gorenzweig, Wuppertal (DE); Joerg Simon, Wuelfrath (DE)

(73) Assignee: Huf Huelsbeck & Fuerst GmbH & Co. KG, Velbert (DE)

( * ) Notice: Subject to any disclaimer, the term of this patent is extended or adjusted under 35 U.S.C. 154(b) by 3 days.

(21) Appl. No.: 15/138,715

(22) Filed: Apr. 26, 2016

(65) Prior Publication Data

US 2016/0323484 A1    Nov. 3, 2016

(30) Foreign Application Priority Data

Apr. 30, 2015  (DE) .................. 10 2015 106 799
May 29, 2015  (DE) .................. 10 2015 108 544
Jun. 9, 2015   (DE) .................. 10 2015 109 051
Oct. 19, 2015  (DE) .................. 10 2015 117 775
Oct. 19, 2015  (DE) .................. 10 2015 117 778
Oct. 19, 2015  (DE) .................. 10 2015 117 780

(51) Int. Cl.
  *H04N 5/225*   (2006.01)
  *B60R 11/04*   (2006.01)
  *B60R 11/00*   (2006.01)

(52) U.S. Cl.
  CPC ........... *H04N 5/2252* (2013.01); *B60R 11/04* (2013.01); *H04N 5/2257* (2013.01); *B60R 2011/004* (2013.01)

(58) Field of Classification Search
  CPC ..... B60R 11/04; B60R 2011/004; B60R 1/00; B60R 2011/0082; B60R 2300/806; B60R 2001/1223; B60R 2300/101; B60R 2300/8066; H04N 5/2252
  See application file for complete search history.

(56) References Cited

U.S. PATENT DOCUMENTS

| | | | |
|---|---|---|---|
| 5,459,541 A * | 10/1995 | Arai ................... | G03B 1/50 396/380 |
| 8,243,137 B2 * | 8/2012 | Schuetz ................ | B60R 11/04 348/148 |
| 8,830,317 B2 | 9/2014 | Meier | |

(Continued)

FOREIGN PATENT DOCUMENTS

EP    2 054 572 A1    5/2009

*Primary Examiner* — Chia-Wei A Chen
(74) *Attorney, Agent, or Firm* — Fay Sharpe LLP

(57) ABSTRACT

A camera apparatus for a motor vehicle includes a carrier housing which is disposed on a moveable vehicle part, and a camera module coupled to the carrier housing. The camera module includes a drive unit and a camera unit, wherein the drive unit is coupled to the camera unit and the drive unit is also coupled to a control mechanism. The camera unit is supported in the carrier housing such that it can rotate about a camera rotational axis, and can be rotated within an adjustment range, wherein the camera module forms at least a section of a handle extending along the camera rotational axis, with which a sensor mechanism, designed for sensing a proximity to the handle and/or for detecting an actuation of the handle, is coupled.

7 Claims, 13 Drawing Sheets

(56) References Cited

U.S. PATENT DOCUMENTS

| | | | |
|---|---|---|---|
| 2009/0040300 A1 | 2/2009 | Scribner | |
| 2010/0124414 A1* | 5/2010 | Brown | F16M 11/2035 396/421 |
| 2010/0278523 A1* | 11/2010 | Brown | F16M 11/2035 396/421 |
| 2010/0286875 A1* | 11/2010 | Inoue | B62D 15/027 701/49 |
| 2012/0099851 A1* | 4/2012 | Brown | F16M 13/04 396/421 |
| 2014/0211333 A1* | 7/2014 | Lang | B60R 1/074 359/844 |
| 2014/0340521 A1* | 11/2014 | Obata | B60R 1/00 348/148 |
| 2015/0158435 A1* | 6/2015 | Ohsumi | G01C 3/18 348/375 |
| 2015/0183366 A1* | 7/2015 | Da Deppo | B60R 11/04 701/2 |
| 2015/0183380 A1* | 7/2015 | Da Deppo | H04N 7/183 348/148 |
| 2015/0258944 A1* | 9/2015 | Buschmann | B60R 11/04 348/373 |
| 2016/0023620 A1* | 1/2016 | Matori | B60R 11/04 348/148 |
| 2016/0082896 A1* | 3/2016 | Mouser | B60R 11/04 348/148 |
| 2016/0096488 A1* | 4/2016 | Poliquin | H04N 5/2252 348/148 |
| 2016/0144798 A1* | 5/2016 | Yoshikuni | B60R 11/04 348/148 |
| 2016/0219204 A1* | 7/2016 | Nickel | H04N 5/2251 |
| 2016/0236558 A1* | 8/2016 | Koseki | E05B 83/18 |
| 2016/0243988 A1* | 8/2016 | Peterson | B60R 1/072 |
| 2016/0272163 A1* | 9/2016 | Dreiocker | B60S 1/56 |
| 2016/0304029 A1* | 10/2016 | Villanueva | H04N 5/2252 |
| 2017/0050581 A1* | 2/2017 | Buss | B60R 11/04 |
| 2017/0057423 A1* | 3/2017 | Wang | B60R 11/04 |
| 2017/0106799 A1* | 4/2017 | Di Gusto | B60R 1/076 |
| 2017/0282806 A1* | 10/2017 | Peterson | B60R 1/072 |

* cited by examiner

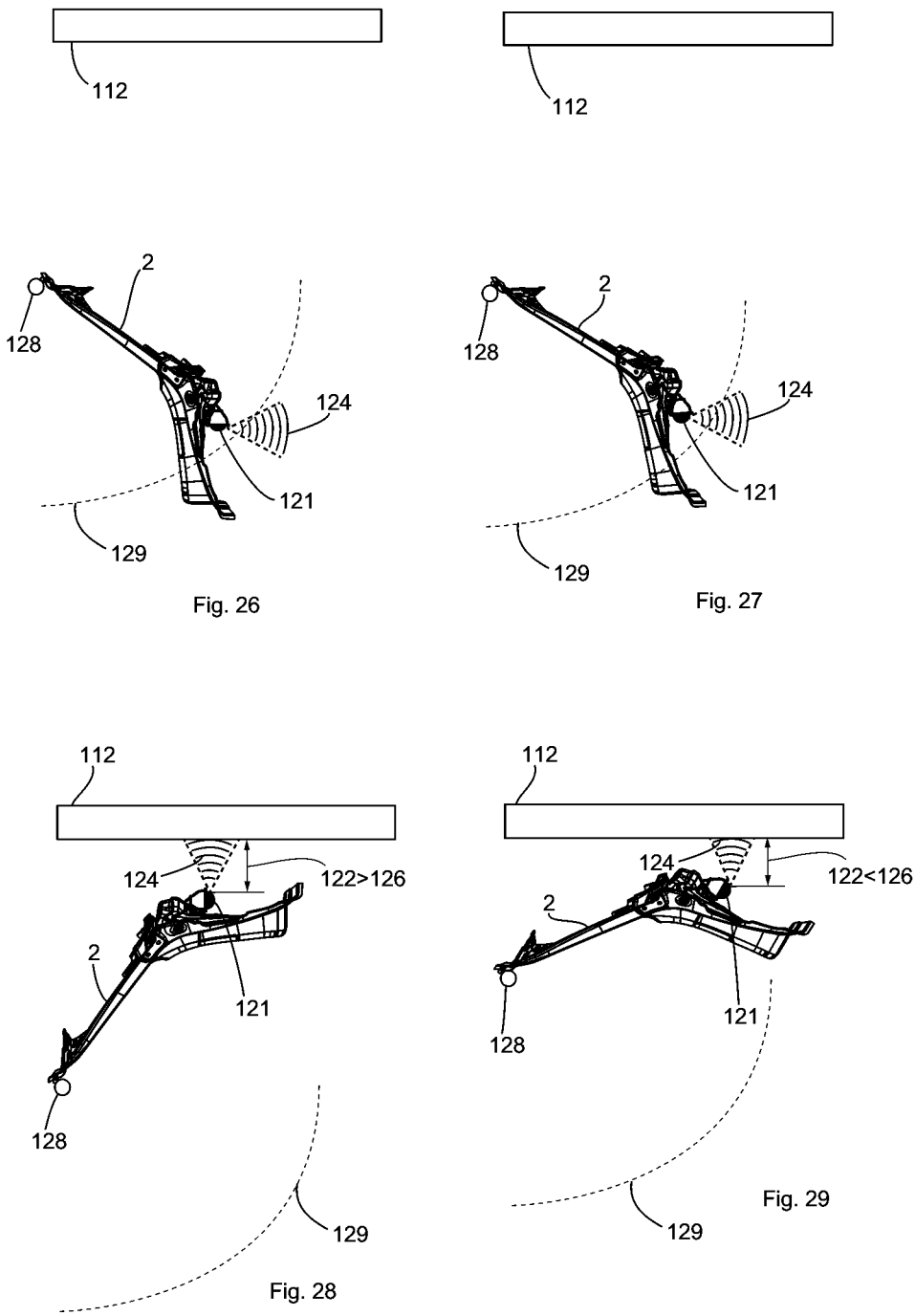

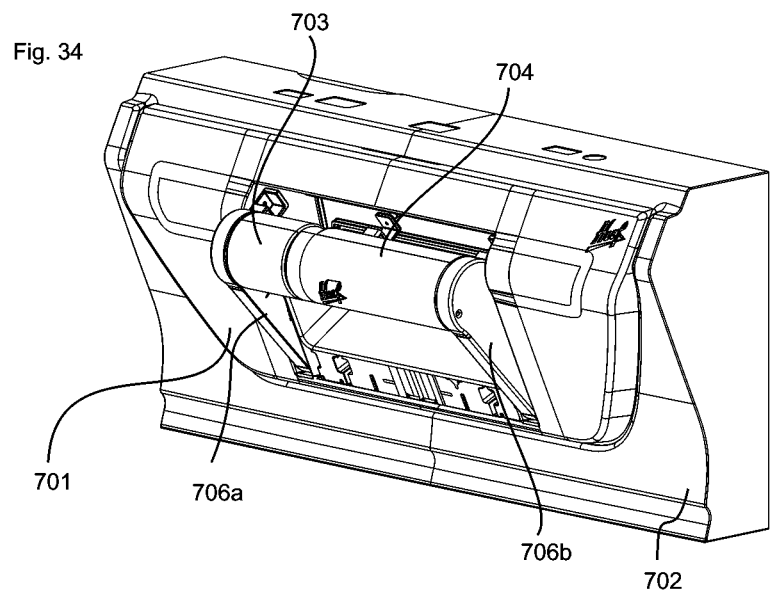
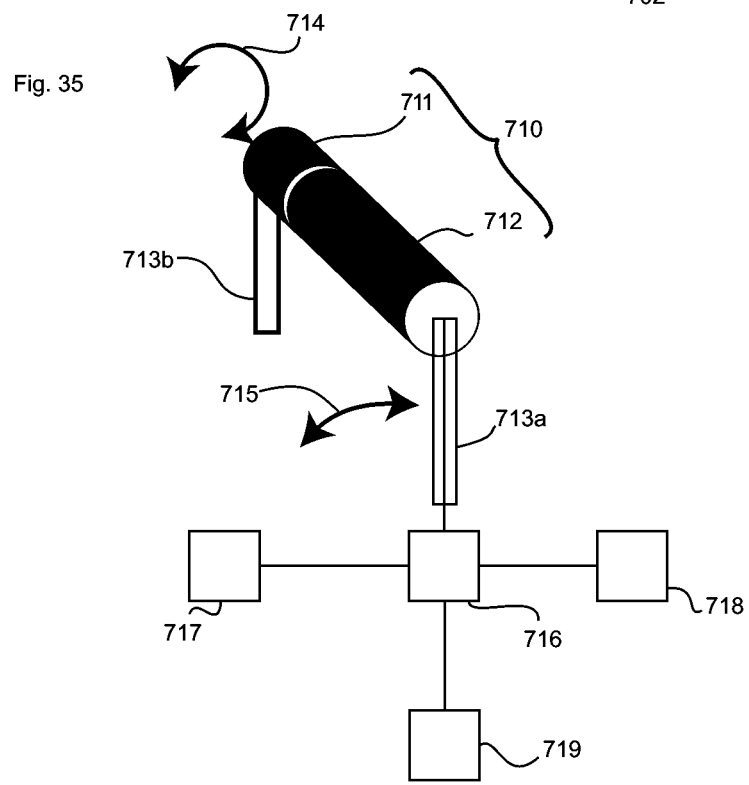

CAMERA APPARATUS FOR A MOTOR VEHICLE

BACKGROUND

The invention relates to a camera apparatus for a motor vehicle, having a carrier housing, which is disposed on a movable vehicle part of the motor vehicle, and a movable camera module coupled to the carrier housing, which comprises a drive unit and a camera unit, wherein the drive unit is coupled with a control mechanism, such that the camera unit can be adjusted with respect to the carrier housing, within an adjustment range, through the control of the control mechanism.

The invention also relates to a reverse driving camera apparatus for a motor vehicle, having a carrier housing, which is disposed on a movable vehicle part of a motor vehicle, and a camera module, which comprises a drive unit and a camera unit, wherein the camera unit is designed such that it can move by means of the drive unit between a retracted standby position in the carrier housing and an extended position, protruding out of the carrier housing.

Likewise, the present invention relates to a hatchback system of a motor vehicle, having a hatchback that can be latched and pivoted open, which is rotatably attached to the motor vehicle by means of a drive, and a reverse driving camera apparatus, having a carrier housing, which is attached to the hatchback that can pivot in relation to the motor vehicle, and a camera module, which comprises a drive unit and a camera unit, and is accommodated in the carrier housing, wherein the camera unit is designed such that it can move by means of the drive unit between a retracted standby position in the carrier housing, and an extended position protruding from the carrier housing.

Camera apparatuses are used in motor vehicles for monitoring regions that are not adequately visible. In particular, reverse driving camera apparatuses are used, for example, to provide the driver with an improved visibility behind the hatchback of the motor vehicle. For this, a monitor is provided in the cockpit of the motor vehicle, wherein a camera module is disposed in the rear of the motor vehicle in either a stationary manner, or such that it can be moved between a standby position and a recording position.

A camera apparatus of the type indicated in the introduction is known, by way of example, from EP 2 054 572. Therein, the camera module, or the camera, respectively, is temporarily accommodated in a covered standby setting, or standby position, behind a vehicle emblem, and can be extended from this standby position into a recording position, wherein it executes a pivotal movement and a translational movement. The camera module, or the camera, of the specified type has a camera lens, which is moveably coupled to the carrier housing. The carrier housing can be secured in a recess on the automobile body. A drive unit is coupled to the camera lens, or the camera, respectively, wherein the drive unit is coupled, in turn, with a control mechanism, such that the camera lens can be adjusted in relation to the carrier housing, within an adjustment range, through the control of the control mechanism. In the specified example from the prior art, the adjustment range extends between standby position and the recording position. The carrier housing is disposed on a moveable vehicle part, in particular the hatchback of the motor vehicle, in the specified example. Furthermore, the carrier housing is pivoted, together with the camera module, in relation to the rest of the motor vehicle, when the hatchback is opened.

In addition to the reverse driving camera apparatus described above, hatchback systems are also known from the prior art, having such a reverse driving camera apparatus. In order to ensure a sufficient accessibility to a space covered by the hatchback, such as a trunk space, the hatchbacks of these hatchback systems are designed such that they extend over the outer contours of the vehicle, in particular over the upper edge of the vehicle, when they are open. These hatchbacks are furthermore often provided with spring elements, which cause the hatchbacks to open into their open positions after they have been unlatched. In doing so, the hatchback can collide with an object when it opens, such as the ceiling of a garage, for example, such that the shell of the hatchback is damaged. Furthermore, when the hatchback is unlatched, it can swing open, hitting a person standing in front of it, which may result in undesired injuries. Cameras of this type are also used with utility vehicles, particularly with vehicles having an open cargo area.

US 2009/0040300 describes a camera assembly for monitoring the rear area and the region of a trailer hitch for a utility vehicle.

Based on this prior art, the fundamental object of the invention is to provide an improved camera apparatus for a motor vehicle in a structurally simple manner.

BRIEF SUMMARY

The object is achieved by means of a camera apparatus having the features of Claim 1. In particular, the object is achieved in that the camera unit is supported in the carrier assembly such that that it can rotate about a camera rotational axis, and can rotate within the adjustment range between at least two positions, wherein the camera module forms at least one section of a handle extending along the camera rotational axis, with which a sensor mechanism is coupled that is designed for sensing a proximity to the handle and/or to detect an actuation of the handle.

The camera apparatus according to the invention has a camera module, which is moveably coupled to the carrier housing. The carrier housing is designed to be attached to the motor vehicle, such that the carrier housing can be secured, by way of example, in a recess in a panel of the auto body.

A drive unit is coupled to the camera unit, and the drive unit is also coupled to a control mechanism, such that the camera unit can be adjusted in relation to the carrier housing, within an adjustment range, through control of the control mechanism. The camera unit, including the drive unit, can be accommodated in the carrier housing, or it can protrude out of the carrier housing. The carrier housing itself is attached to a moveable vehicle part in the manner specified above, such that it is stationary and immobile.

With the camera apparatus according to the invention, the camera unit is rotatably supported in or on the carrier housing, such that the camera unit can rotate about a camera rotational axis. The adjustment range defines an angle of rotation within which the camera unit can be rotated by means of the drive unit.

The camera module is designed such that it forms a section of a handle. The handle extends at least in sections along the camera rotational axis, and is supported in the carrier housing such that it can move from a standby position into an actuation position by means of actuation thereof. A sensor mechanism is coupled to the handle, in order to detect an actuation of the handle. The handle is formed on the moveable component for operating the moveable component, e.g. the side doors, hatchback or tailgate. The handle is attached to the carrier housing for this, such that it can be moved in an arbitrary manner. The important thing is that a part of the handle is formed by the rotatable camera module, which can be gripped or pressed in sections for the actuation, and serves for the mechanical actuation. The handle thus also contains the camera module, or a part thereof, which in turn can be rotated inside the handle and along a rotational axis for recording. In a more concrete design, the invention provides, thereby, that the drive unit has a housing, wherein the handle is integrated on a section of the housing that can be held by a user.

Because an actuation of the handle for opening or closing the moveable vehicle component does not occur at the same time as the recording by the camera apparatus, the functions of the camera module and the handle do not interfere with one another.

At least the camera unit can also be rotated into the standby position, in a protected position, as a result of its rotatability, such that when the handle is operated, sensitive components are protected, and the camera lens does not become dirty. The rotatability of the camera unit with the rotational axis in the orientation of the handle allows for a compact and robust design. Because the handles on vehicles are furthermore disposed at readily accessible positions on the vehicle, an advantageous position of the camera is obtained by the combined handle and camera integration. As a result, recordings of the surroundings can be made from advantageous positions, which are normally reserved for vehicle handles.

By integrating the camera as a rotatable camera unit inside the handle, it is also possible to eliminate covering elements and protective elements. The camera is rotated into a standby position when not in use, wherein it is accommodated in a protected manner in this standby position, which turns the lens toward the interior of the vehicle, for example, and serves exclusively as a section of the handle.

The camera apparatus can be designed to be particularly compact, when the sensor mechanism is disposed in the handle, according to an advantageous design, wherein the handle is designed as part of the housing.

It is particularly advantageous thereby when the sensor mechanism comprises a capacitive sensor system, coupled to the control mechanism, which detects a proximity to the handle. Capacitive sensors are known in the field of door handles for motor vehicles, and detect the proximity or touch of a user, e.g. the proximity of the hand of a user.

In an alternative design, the invention provides that the handle is designed as a button element, which can move in relation to the housing of the drive unit. The button element offers the possibility thereby of giving the user a tactile actuation feeling.

In a further development of the alternative design, it is then provided that the housing of the drive unit is designed in the manner of a tube, and has a recess having a circle-section shaped cross section, wherein the button element has a circle-section shaped cross section, and is disposed in the recess such that it is flush therewith. The tube-shaped drive unit is disposed thereby such that it is axially offset to the camera unit. With the tube-shaped design of the camera unit, the camera unit and the drive unit can form a visual unit, which can define the handle, either as a whole, or only a section thereof.

In order to implement the relative movement between the button element and the housing, the design of the invention provides that an intermediate element, having an elastic, deformable, bellows-like design and that enables a movement of the button element in relation to the housing, is disposed between an edge formed by the recess and an encompassing edge of the button element facing the housing. The bellows-like design enables, on one hand, the relative mobility of the button element connected to the housing via the intermediate element. The intermediate element also seals the interior of the housing and the gap between the button element and the housing, such that no moisture and contaminants can end up in the interior of the housing for the drive unit.

It is particularly convenient and space-saving, structurally, when the button element has a least one tappet pointing toward the interior of the housing, which interacts with the sensor mechanism when the button element is actuated, and activates it.

One possibility for the design of the sensor mechanism in further designs of the invention, exists in that the sensor mechanism is designed as a micro-switch with a button, disposed inside the housing and coupled to the control mechanism, wherein the tappet actuates the button for activation when the button element is actuated.

Another possibility for the design of the sensor mechanism is that the sensor mechanism is designed as a click disk, disposed in the interior of the housing, and coupled to the control mechanism, which bears on a contact element when the button element is actuated. A click disk is derived from a known clicker, and is used analogously with a button switch, in which the click disk represents the component providing the contact. The effect is used thereby, according to which the click disk has a stable and a metastable state, and is bowed when subjected to a force, until it passes through the metastable state due to deformation. The mode shift at this point generates the loud clicking sound, which can be heard by the user, and indicates to him that the button element has been actuated.

In the designs addressed above, the camera module is disposed in a stationary manner on the carrier housing, because an actuation of the handle actuates a button element or is detected by a sensor.

Alternatively, the design of the invention provides that the handle is supported in the carrier housing such that it can be moved from a standby position, through actuation thereof, into an operating position.

One possibility of achieving this, in a structural design, is that the handle is coupled to the carrier housing by means of at least one pivot arm, wherein the handle can be pivoted with the camera rotational axis in relation to the carrier housing by means of the pivot arm, and wherein the at least one pivot arm forces the handle into its standby position with elastic reset means. The reset means exert an elastic reset force and guide the handle back into the standby position after it has been actuated. By this means, it is ensured that at least the camera unit assumes a defined position when the handle is in the standby position.

When the at least one pivot arm is moved in relation to the carrier house, it is advantageous for the design of the invention when the sensor mechanism is disposed inside the carrier housing, wherein a movement of the handle from the standby position into the actuation position activates the sensor mechanism. Alternatively, it is also conceivable, as a matter of course, that the sensor mechanism is attached to the camera module, or the pivot arm, and the relative movement thereof leads to activation.

It is then furthermore provided in the design of the invention that the sensor mechanism is designed as a micro-switch coupled to the control mechanism, which is attached in a recess in the carrier housing, wherein the at least one pivot arm has an actuation attachment, which triggers the micro-switch when the handle is moved into the actuation position. The actuation attachment ensures therefore, through its movement in relation to the carrier housing, that it actuates the micro-switch, in that the actuation attachment presses against the button element.

As an alternative to the micro-switch, it is conceivable in the design of the invention, that the sensor mechanism is designed as a Hall effect sensor coupled to the control mechanism, which is disposed in the carrier housing such that a magnet attached to the at least one pivot arm can move in relation to the Hall sensor, and a movement of the at least one pivot arm when the handle is moved into the actuation position triggers the Hall sensor.

Thus, the camera rotational axis can be disposed on one end of the pivot arm, wherein the pivot arm itself is supported on the carrier assembly at its other end. As a result, the pivot arm functions as a lever, which can be actuated via the handle coupled thereto. As has already been explained above, alternatively, sensors can be disposed on the pivot arm itself, such as a micro-switch, for example, which function as signal transmitters for an actuation of the handle. The drive unit of the camera unit can be disposed in the handle itself, and the lines for the drive unit as well as the signal lines for the camera unit can be guided through the pivot arm, or along the pivot arm in the carrier housing, where they are connected to the wiring harness of the motor vehicle. As indicated in the designs of the invention, the drive unit is also disposed in the carrier housing, and a transmitting element, e.g. a toothed belt or other drive train, can be guided by the pivot arm, in order to apply a rotational drive force to the camera unit from the carrier housing.

Preferably, an electrical rotary motor is also disposed in the camera rotational axis, as a component of the drive for the camera lens in the handle, such that the shaft of the motor lies in the camera rotational axis, and the motor can be pivoted together with the camera lens in the form of a handle, having the pivot arm. The accommodation of both the camera lens and the drive in the handle result in a particularly compact design for the camera/handle assembly.

It is likewise an object of the invention to create a solution, which provides an improved reverse driving camera apparatus and an improved hatchback system in a structurally simple manner and economically, which avoids the problems known from the prior art. In particular, it is to be prevented, with the aid of the invention, that the hatchback moves against an obstacle in an undesired manner when being opened.

The object is achieved by means of a camera apparatus having the features of Claim 1. In particular, the object is achieved in that the camera unit is disposed in the extended position, at least during a movement of the vehicle part, and that the camera module has at least one distance detection means for determining a spacing between the vehicle part and an obstacle disposed in the movement path of the vehicle part. Likewise, with a hatchback system of the type indicated in the introduction, the object is achieved according to the invention, in that the camera unit is disposed in the extended position, at least during an opening movement of the hatchback, and that the camera module has at least the distance detection means determining the spacing between the hatchback and an obstacle disposed in the movement path of the pivotable hatchback.

A reverse driving camera apparatus as well as a hatchback system are provided by the invention, in accordance with Claims 1 and 7, which are distinguished by a structure tailored to function, and have a simple and economic construction. According to the invention, the camera module of the reverse driving camera apparatus has the at least one distance detection means, by means of which a compact and space-saving construction of the hatchback system, or the reverse driving camera apparatus is obtained. The at least one distance detection means is designed for detecting objects, at least during the opening movement of the hatchback, wherein the distance detection means monitors the movement path of the hatchback from its closed position into the opened position. If an obstacle arises during this opening procedure, the pivoting procedure of the hatchback is interrupted and stopped. As a result, it is effectively prevented that the hatchback collides with an obstacle during the opening procedure, and the outer region of the hatchback becomes damaged.

In the design of the invention according to Claim 1, a particularly compact camera module can be obtained in that the distance detection means is the camera itself. With the appropriate software, the sequences recorded by the camera unit can be evaluated and checked to see if there is an obstacle in the movement path of the hatchback during its opening movement.

The invention according to Claim 1 provides, in an alternative design, that the distance detection means has at least one ultrasound sensor unit. Thus, not the camera, but an extra component, provided for this, is used, which emits ultrasound waves, which are reflected by an obstacle in the manner of an echo, and received by the ultrasound sensor unit. Either the received signal is evaluated directly in the ultrasound sensor unit, or an evaluation apparatus coupled to the ultrasound sensor unit is provided for the evaluation.

In the design of the alternative, the invention provides, advantageously, for the reverse driving camera apparatus, that the at least one ultrasound sensor unit is accommodated in a housing for the camera unit. Because the reverse driving camera has an adjustment mechanism, by means of which the camera unit is oriented toward the region that is to be monitored during the reverse driving of the motor vehicle, this adjustment mechanism can be used for orienting the ultrasound sensor unit, such that an additional drive for orienting or adjusting the ultrasound sensor unit can be eliminated.

As a variation on the design of the preceding alternative, it is furthermore provided, according to the invention, that the at least one ultrasound sensor unit is accommodated in a housing for the drive unit. In this manner, the ultrasound sensor unit can be integrated in existing components and parts of the reverse driving camera apparatus in a space, or installation space, saving manner.

According to another design of the invention for the reverse driving camera apparatus according to Claim 1, it is advantageous when the camera unit is supported such that it can rotate in relation to the carrier housing about an adjustment axle coupled to the drive unit, and can move between the standby position and the extended position about the adjustment axle through rotation, wherein an eccentric component is moveably coupled to the adjustment axle, which bears on a support of the carrier housing, such that a rotation of the eccentric component changes the spacing of the adjustment axle to the support, such that the camera unit protrudes out of the carrier housing. Because the movement of the camera unit from the standby position into a recording position is a rotation about the adjustment axle, a more compact construction having a smaller installation space for the reverse driving camera apparatus according to the invention is obtained, in particular because long extension paths are not needed in order to activate the camera unit, and to move it from the standby position into the extended position.

Furthermore, the reverse driving camera apparatus according to the present invention enables various orientations of the camera lens, because different regions of the surroundings can be recorded through different angles of rotation, or rotational angles, about the adjustment axle, such that the driver can record desired regions of the surroundings by determining the angle of rotation. Furthermore, the camera unit can be returned to the standby position through quick and simple rotation, where it is disposed in the carrier housing, protected and shielded against the environment. The eccentric component serves to further enlarge the viewing range, which causes the extension, or protruding movement of the adjustment axle, and thus the camera module from the carrier housing, by means of which the variability of the recording of the surroundings, as well as the recording range itself, is increased.

The invention provides in another design of the reverse driving camera apparatus according to Claim 1, that the adjustment axle is coupled to the carrier housing via at least one pivot arm, wherein the camera unit can be pivoted into the extended position in relation to the carrier housing, via the adjustment axle and the at least one pivot arm. The adjustment axle runs through a pivot arm of the carrier housing, and can pivot, together with the pivot arm, in relation to the carrier housing. In this design of the invention, the carrier housing is thus mounted on the moveable vehicle part, e.g. the hatchback. A pivot arm forms a part of the carrier housing, and this pivot arm can pivot with respect to the part of the carrier housing secured to the vehicle. The camera unit is rotatably disposed on the pivot arm itself, such that both a pivotal movement of the camera unit as well as a rotational movement of the camera unit are possible. The coupling of the camera unit to the carrier housing via a pivot arm is particularly advantageous, because in this manner, a second type of movement of the camera unit in relation to the carrier housing is possible, in that the pivot arm is pivoted outward in relation to the carrier housing. The camera unit can thus rest, for example, in an in active state, in the carrier housing, in moveable vehicle parts, and when a recording is desired, is pivoted outward a short distance via the pivot arm, away from the outer walls of the carrier housing and the supporting component, in order to record a larger viewing field in the rear region of the vehicle. In addition, the camera can be rotated, in order to be optimally oriented, independently of the position of the supporting component.

In another design of the invention for the reverse driving camera apparatus according to Claim 1, it is particularly preferred when the at least one pivot arm is tensioned against the carrier housing by means of elastic reset means, such that the at least one pivot arm forces the camera unit into the standby position. In other words, the at least one pivot arm, with which the camera lens can be pivoted outward in relation to the carrier housing, has elastic reset means. The pivot arm is tensioned against the carrier housing with these elastic reset means, such that the pivot arm, together with the camera unit, is forced against the carrier housing. The tensioning or resetting means thus serve to return the pivot arm, with the camera unit, to a standby position inside the receiving area of the carrier housing. The pivoting outward from this position must occur counter to the tension, by means of the drive unit, for example.

Lastly, in a further design of the reverse driving camera apparatus according to Claim 1, the invention provides that, furthermore, the drive unit is disposed in the adjustment axle, wherein the drive unit, together with the camera unit, can be pivoted from the standby position into the extended position, and back, via the at least one pivot arm. In this manner, a particularly compact construction is made possible. The drive unit is pivoted outward, together with the pivot arm, and drives the camera. In this context, a drive also comprises drives having a transmission, such that the rotational movement of a motor acts on the camera unit in a gear ratio. Thus, the rotary motor is used for rotating the camera unit as well as for pivoting the pivot arm. For the purpose of pivoting, in addition to the camera unit, the eccentric component is also coupled to the motor shaft, which bears against a support means on the carrier housing. Depending on the angle of rotation of the eccentric component, the adjustment axle moves away from the support means, and the pivot arm is pushed away from the carrier housing, together with the camera lens and the motor or drive unit, counter to the return force.

It is furthermore provided in the design of the hatchback system, that the at least one distance detection means is coupled to at least one evaluation unit that compares the determined spacing with a predefined safety distance, which is designed to transmit a signal to the drive for stopping the movement of the hatchback when the spacing falls below the safety distance. This is either an acoustic signal, which prompts the vehicle driver to stop the movement of the hatchback for a moment, or a signal that triggers a control mechanism such that it stops the opening movement of the hatchback, in that a corresponding drive, connected to the opening movement, is controlled accordingly.

Lastly, in the design of the hatchback system, the invention provides that the camera unit of the camera module is disposed in the extended position at the latest when, during the opening movement, the moveable vehicle part, or the hatchback, respectively, is pivoted a maximum of 5° about a point of rotation on the motor vehicle. As a result, the power consumption of the camera module is reduced to a minimum, because the camera unit is first moved into the extended position when an opening movement is seriously intended.

Lastly, it is an object of the invention to provide an improved camera apparatus for motor vehicles. The object is achieved by means of a camera apparatus having the features described herein.

The camera apparatus according to the invention is coupled, in turn, to a control device, such that the camera lens can be adjusted within an adjustment range in relation to the carrier assembly, by controlling the control mechanism. The camera lens, including the drive, can be accommodated in the carrier assembly, or it can also protrude out of the carrier assembly. The carrier assembly itself is secured to a moveable vehicle part in the manner specified above, such that it is stationary and immobile.

With the camera apparatus according to the invention, the camera lens is rotatably supported in or on the carrier assembly, such that the camera lens can rotate about the camera rotational axis. The adjustment range defines an angle of rotation, inside which the camera lens can rotate, by means of the drive.

The camera lens is designed such that it forms a section of a handle. The handle extends, at least in a section, along the camera rotational axis, and is supported in the carrier assembly such that it can be moved from the standby position into an actuation position through actuation thereof. A sensor mechanism is coupled to the handle, in order to detect an actuation of the handle. The handle is formed on the moveable component in order to operate the moveable component, e.g. the side door, hatchback or tailgate. The handle is attached in an arbitrary manner to the carrier assembly, such that it can be pivoted outward, for this purpose, e.g. as a pulling handle or a pivot handle, which is hinged to the carrier assembly via pivot arms. The important thing is that a part of the handle is formed by the rotatable camera apparatus, which is grasped in sections in order to actuate it, and which serves as the mechanical actuation. The handle thus contains the camera lens, which in turn, can be rotated inside the handle, and along a rotational axis, for recording.

Because an actuation of the handle for opening or closing the moveable vehicle component does not occur at the same time as the recording by the camera apparatus, the functions of the camera and the handle do not interfere with one another.

The camera can also be rotated into a protected position as a result of its rotatability in the standby position, such that when the handle is operated, sensitive components are protected, and the lens does not become dirty. The rotatability of the camera with the rotational axis in the orientation of the handle provides for a compact and robust design. Because the handle mechanisms on vehicles are also disposed at easily accessible locations on the vehicle, an advantageous position of the camera is ensured by the combined handle and camera integration. As a result, recordings of the surroundings can be made from advantageous positions, which would normally be reserved for vehicle handles.

As a result of the integration of the camera as a rotatable camera in the handle, it is also possible to eliminate cover elements and dirt-protection elements. The camera is rotated into a standby position when it is not in use, wherein, in this standby position, which rotates the lens toward the interior of the vehicle, for example, it is accommodated in a protected manner, and serves exclusively as a section of the handle.

In the embodiment of the camera, it is particularly advantageous when the handle, and thus the camera lens as well, as a section of the handle, is coupled to the carrier assembly via at least one pivot arm. The handle, with the camera rotational axis, can then be pivoted via the pivot arm, and in relation to the carrier assembly.

The camera rotational axis can be disposed at one end of the pivot arm, and the pivot arm itself is supported at its other end on the carrier assembly. As a result, the pivot arm functions as a lever, which can be actuated via the handle coupled thereto. Sensors can be disposed on the pivot arm itself, e.g. micro-switches, which serve to emit signals for a handle actuation. The drive for the camera lens can be disposed in the handle itself, and the lines for the drive, as well as the signal lines for the camera lens, can be guided through the pivot arm, or along the pivot arm, into the carrier assembly, where they are connected to the wiring harness for the vehicle. Alternatively, the drive can also be disposed in the carrier assembly, and a transmission element, e.g. a toothed belt or other drive train can be guided by the pivot arm, in order to exert a rotational drive force on the camera lens from the carrier assembly.

Preferably, the pivot arm is tensioned against the carrier assembly with elastic reset elements, such that the pivot arm, with the handle, is forced into a recess in the carrier assembly in a position bearing on the carrier assembly.

The reset means exert an elastic reset force, and guide the handle, after actuation, back into the standby position. In this manner, it is ensured that the camera assumes a defined position when the handle is in the standby position.

Preferably, with the camera, there is also an electric rotary motor in the camera rotational axis, which is disposed in the handle as a component of the drive for the camera lens, such that the shaft of the motor lies in the camera rotational axis, and the motor, together with the camera lens serving as a handle, can be pivoted with the pivot arm.

The accommodation of both the camera lens, as well as the drive, in the handle provides for a particularly compact design of the camera/handle assembly.

As set forth in the invention, the term "hatchback" refers to a trunk lid in notchback sedans or fastback sedans, as well as the hatchback on a station wagon or a van, as well as the tailgates for delivery vans and trucks. Furthermore, it is to be understood that the features specified above and still to be explained can be used, not only in the respective specified combination, but also in other combinations or in and of themselves, without abandoning the scope of the present invention. The scope of the invention is defined only by the Claims.

BRIEF DESCRIPTION OF THE DRAWINGS

Further details, features and advantages of the subject matter of the invention can be derived from the following description in conjunction with the drawings, in which exemplary preferred embodiment examples of the invention are depicted. In the drawings:

FIG. 26 shows a side view of a hatchback system according to the invention, with the camera module in the standby position, and with the hatchback closed and latched, FIG. 27 shows a side view of the hatchback system according to the invention, which is pivoted upward, approximately 5° from the latched position, FIG. 28 shows a side view of the hatchback system according to the invention, with the camera module in the extended position, and with the hatchback pivoted upward, such that it is pivoted approximately 90° from the latched position, and FIG. 29 shows a side view of the hatchback system according to the invention, with the camera module in the extended position, and with the hatchback pivoted upward, such that it is pivoted less than 90° form the latched position, and in which an obstacle is disposed in its movement path, FIG. 34 shows the exemplary embodiment from FIGS. 30 to 33, wherein the handle is moved into an actuation position, and FIG. 35 shows, in a schematic manner, the camera apparatus and its coupling to the control mechanism.

DETAILED DESCRIPTION

Figure 1:
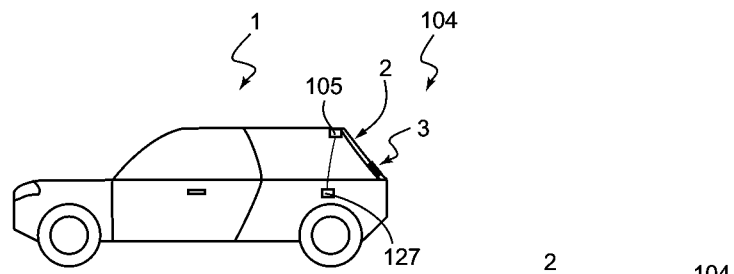
FIG. 1 shows a side view of a motor vehicle with a camera apparatus according to the invention.
Figure 19:
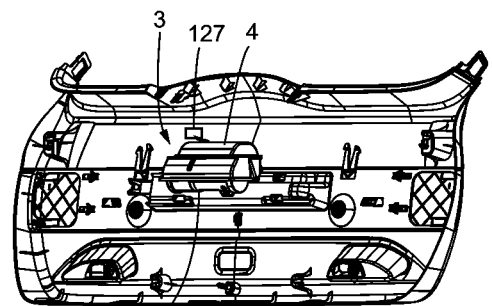
FIG. 19 shows another perspective view of the hatchback form FIG. 2, leaving out some components.

A motor vehicle 1 in the form of a passenger car is depicted in an exemplary manner in FIG. 1, which motor vehicle, in the example, has a moveable vehicle part, or a hatchback 2, respectively, onto which a camera apparatus, or a reverse driving camera apparatus 3 according to the invention is attached. The camera apparatus, or reverse driving camera apparatus, is disposed in the exterior paneling of the vehicle 1, and attached there, hidden in sections, as is shown, in particular, in FIGS. 2 and 19.

Figure 3:
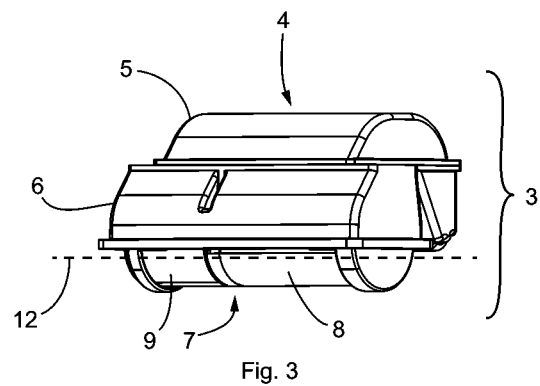
FIG. 3 shows a perspective view of the camera apparatus according to the invention.

The camera apparatus 3 according to the invention is shown in greater detail in FIGS. 3 and 4, which details shall be explained below. The camera apparatus 3 comprises a carrier housing 4, which is disposed on the hatchback, or the moveable vehicle part 2 of the motor vehicle 1, and is attached there, such that it can be pivoted together with the hatchback 2 in relation to the motor vehicle 1. The carrier housing 4 has a two-part design, and comprises a cover 5, which is laser welded to a bottom part 6. Furthermore, the camera apparatus 3 comprises a camera module 7, which can be moved in relation to the carrier housing 4. The camera module 7 has a drive unit 8 and a camera unit 9 with a camera lens 10. The camera unit 9 can be adjusted by means of the drive unit 8, within an adjustment range, where it can be retracted and protected in the carrier housing 6, or where it is disposed such that it protrudes out of the carrier housing 6, for example. The carrier housing 6 itself is secured on the motor vehicle 1 on the moveable vehicle part 2, and does not change its position in relation to this vehicle part 2, but rather, moves together therewith. Furthermore, the drive unit 8 is coupled to the camera unit 9, wherein the drive unit 8 is also coupled to a control mechanism 11, depicted schematically in FIG. 18, such that the camera unit 9 can be adjusted within the adjustment range with respect to the carrier housing 4, through control of the control mechanism 11, and/or the camera unit can be rotated about a camera rotational axis 12.

The camera apparatus 9 with the camera lens 10 is disposed, axial to the drive unit 8, in the carrier housing 4. Both the camera unit 9 as well as the drive unit 8 are coupled to pivot arms 40a, 40b, and disposed between the pivot arms 40a, 40b. The U-shaped pivot arms 40a, 40b are hinged at their lower ends to the carrier housing 4 via bearing points 38a, 38b. Furthermore, the pivot arms 40a, 40b are tensioned with spring elements, or elastic reset means 41a, 41b, against the carrier housing 4, such that the pivot arms 40a, 40b force the camera module 7 into the standby position. When in the standby position, the camera unit 9 and the drive unit 8 lie, at least in sections, in an accommodating space 42 in the carrier housing 4. As can be derived, in particular, from FIG. 3, the camera unit 9 and the drive unit 8 thus form a tube-shaped assembly, which extends between the pivot arms 40a, 40b, and can be pivoted outward collectively, from the carrier housing 4, by means of the pivot arms 40a, 40b. When in the standby position, the camera module 7, and in particular the camera lens 10, points, by way of example, toward the interior of the vehicle, or toward the interior of the carrier housing 4, and is disposed there, protected from external effects. The camera unit 9 and the drive unit 10 can thus be pivoted collectively away from the carrier housing by means of the pivot arms 40a, 40b, wherein at least the camera unit 9 is also rotatable about the camera axis 12 (see FIG. 4, for example).

In the embodiments shown in FIGS. 5 to 13, a housing 14 of the drive unit 8 forms a handle, which is to be actuated in order to open the hatchback 2.

Figure 5:
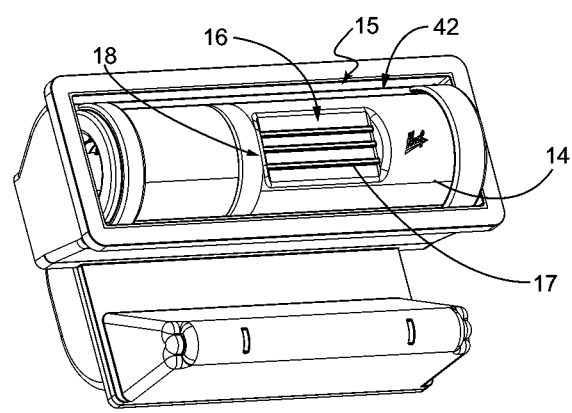
FIG. 5 shows a view from below of the camera apparatus, which has a capacitive sensor system.

In the exemplary embodiment shown in FIG. 5, the handle 15 is designed as a part of the housing 14. This handle 15 and the control device 11 are coupled to a sensor mechanism 16 designed for sensing a proximity to the handle 15, which sensor mechanism comprises a capacitive sensor system 17. A capacitive sensor system 17 of this type is sufficiently known, and reacts without touch, i.e. without direct contact, to a proximity with an electric switching signal, which is received by the control mechanism 11, and implemented accordingly. The capacitive sensor system 17 with its proximity surface 18 exploits the changing electrical capacitance of a measurement electrode to the environment, or a reference electrode, that occurs with a proximity in the known manner thereby.

Figure 6:
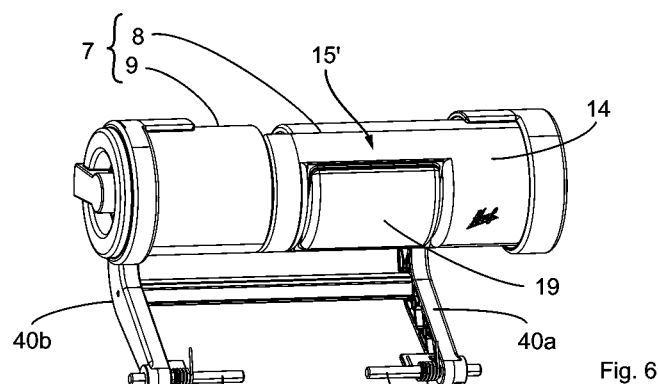
FIG. 6 shows a perspective view of a camera module with a button element, supported via a pivot arm.
Figure 7:
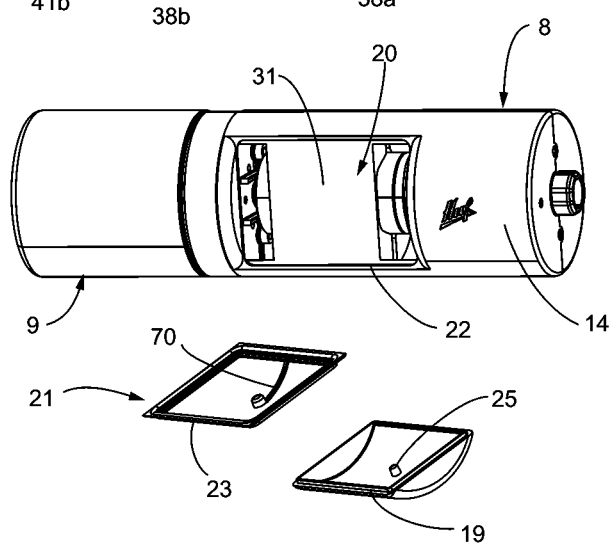
FIG. 7 shows another perspective view of the camera module with the button element, in a detail view.
Figure 8:
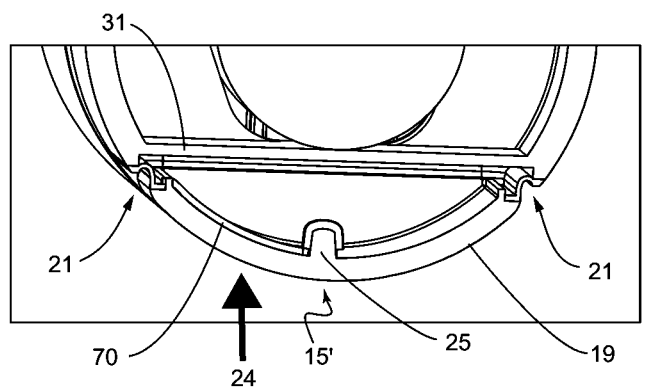
FIG. 8 shows an enlarged, lateral sectional view of the camera module with the button element.
Figure 9:
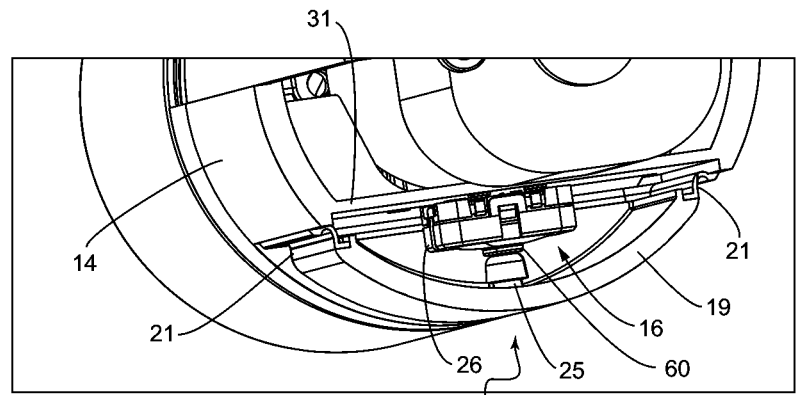
FIG. 9 shows an enlarged, lateral sectional view of the camera module, in which the button element acts on a micro-switch.
Figure 10:
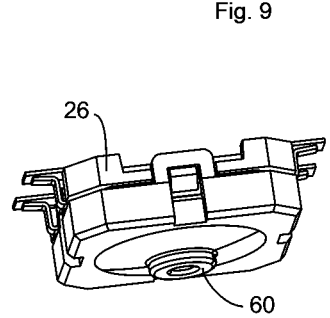
FIG. 10 shows the micro-switch form Figure in a perspective view.
Figure 11:
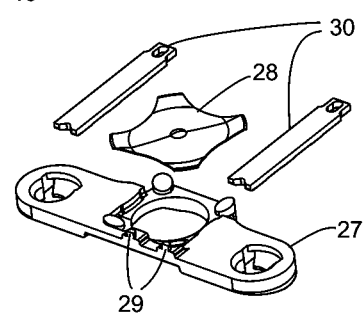
FIG. 11 shows an exploded view of an embodiment of a sensor mechanism as a click disk.
Figure 12:
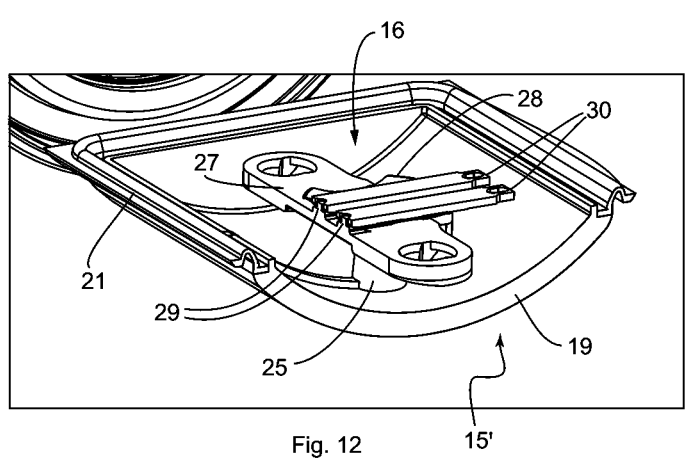
FIG. 12 shows a lateral sectional view of the installed click disk.
Figure 13:
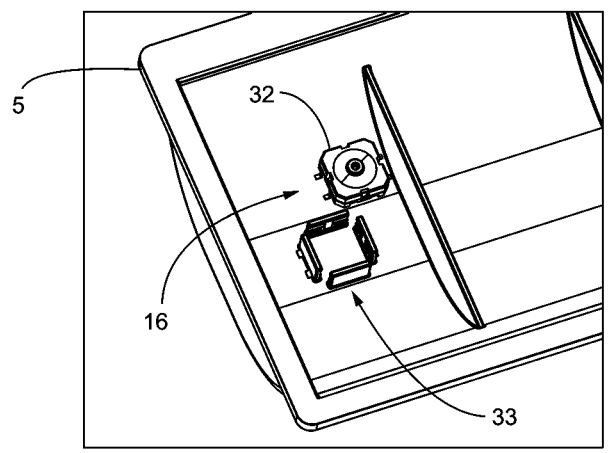
FIG. 13 shows a perspective view of a cover element of the carrier housing, with a receiving space for a micro-switch.

FIGS. 6 to 12 show, on the other hand, an embodiment of a handle 15' designed as a button element 19. The button element 19 integrated in the housing 14 of the drive unit 8 on a section that can accessed by a user. In particular, with this embodiment the button element 19 can move in relation to housing 14. As can be seen in FIGS. 6 to 8, the housing 14 of the drive unit 8 has a tube-shaped design, and has a circle-section shaped recess 20 in the axial cross section. The button element 19 is inserted in this recess 20, in a fitted manner, such that the button element 19 is flush with the housing 19. In order to attach the button element 19 to the housing 14, an intermediate element 21 is provided, which is secured in the edge 22 of the recess 20, and is thus disposed between the edge 22 of the housing 14 and a circumferential edge 23 of the button element 19. The intermediate element 21 is designed in the manner of a bellows, and can be deformed in an elastic manner, such that when the button element 19 is actuated (see arrow 24), the intermediate element 21 is compressed, and returns to its original shape after the actuation. The intermediate element 21, made of a soft material, has a bridge, which extends from a lateral edge of the intermediate element 21 into the center of the intermediate element 21. The free end of the bridge 70 has a protective cap, which dampens an impact on a button 60, which bridge is designed to be complementary to a tappet. The button element 19 is moved toward the interior of the housing 14 as a result of the actuation, by means of which, in particular, the tappet 25 pointing toward the interior of the housing 14, which is disposed on the inner surface of the button element 19, moves inward in the interior of the housing 14, in order to interact with the sensor mechanism disposed in the housing 14, and to activate it. The senor mechanism 16 can be designed in accordance with the exemplary embodiments of FIGS. 9 to 12. FIG. 9 shows a micro-switch 26 designed as a sensor mechanism 16, which is coupled to the control mechanism 11, such that an actuation of the button element 19 pushes the button 60 of the micro-switch 26 via the tappet 25, by means of which a corresponding signal is transmitted from the micro-switch 26 to the control mechanism 11, which then unlatches the hatchback 2, and opens it, in accordance with the signal and the opening desire indicated by the actuation. The micro-switch 26, with its button 60, is shown in a detail view in FIG. 10, wherein this concerns a standard component. FIG. 11 shows, on the other hand, an alternative embodiment in an exploded view, and FIG. 12 shows the assembled state. When actuated, the button element 19 and the tappet 25 formed thereon are likewise moved inward, wherein in this case, they press against a retaining element 27, and move this inward, by means of which a click disk 28 is deformed, by means of which the user reaches a noticeable pressure point with a tactile feedback. On the other hand, through the inward movement of the retaining element 27, contact points 29 formed on the retaining element 27 are brought into contact with contact elements 30, which is then conveyed as a signal to the control mechanism 11 for unlatching the hatchback 2. The click disk 28 designed in the manner of a clicker, is in a stable state, in which there is no contact between the contact points 29 and the contact elements 30, and is in a metastable state, in which the button element 19 is actuated, and the contact elements 30 bear on the assigned contact points 29, accordingly. The metastable state can be discerned in the sectional view of FIG. 12, wherein numerous components above the contact element 30 have been masked in FIG. 12, in order to provide a better overview. The contact elements 30 are coupled to the control mechanism 11 on one hand, and on the other hand, they are attached at the bottom to an intermediate wall 31 of the bottom part 6 (see FIG. 8, for example), such that when the button element 19 is actuated, the contact points 29 are moved toward the contact elements 30. It should be noted at this point that the micro-switch is also secured to the bottom of the intermediate wall 31.

With the embodiments shown in FIGS. 13 to 17, the camera unit 9 as well as the drive unit 8, including their housing 14, collectively form a handle 15". A user can grasp this handle 15" in order to unlatch the hatchback 2. This does not pertain to a pulling of the handle 15", but instead, to a pushing against the handle 15", such that it is moved toward the interior of the carrier housing 4. For this purpose, the pivot arms 40a, 40b are supported accordingly in the carrier housing 4, wherein the reset means 41a, 41b enable a movement of the pivot arms 40a, 40b, in a counterclockwise direction (see FIG. 14, for example), about a pivot axis 43 (see FIG. 14) due to the pressure force caused by an actuation. In other words, the handle 15" is coupled to the carrier housing 4 via at least one pivot arm 40a, 40b, wherein the handle 15", with the camera rotational axis 12, can be pivoted with at least one of the pivot arms 40a, 40b in relation to the carrier housing 4. The at least one pivot arm 40a, 40b also forces, however, the handle 15" into its standby position with the elastic reset means 41a, 41b thereby.

Figure 14:
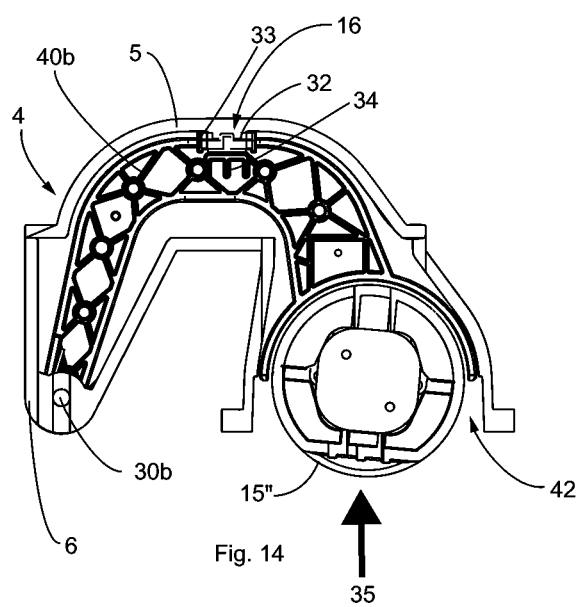
FIG. 14 shows a lateral sectional view of the carrier housing, with the micro-switch attached in the cover element, and a pivot arm.
Figure 15:
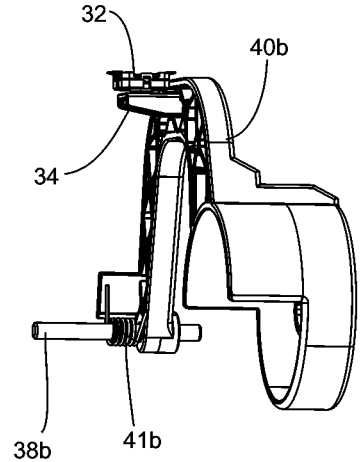
FIG. 15 shows a side view of a pivot arm, from which an actuation attachment interacts with the micro-switch.
Figure 16:
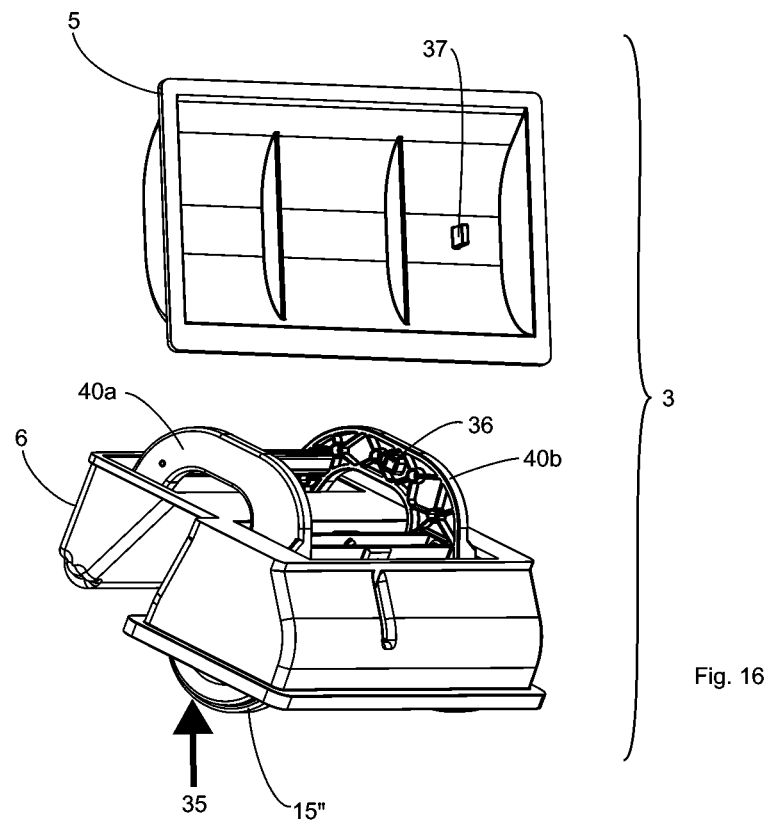
FIG. 16 shows the camera apparatus according to the invention, in which the cover element of the carrier housing is open, and a Hall sensor on the pivot arm and a magnet in the cover element are depicted.
Figure 17:
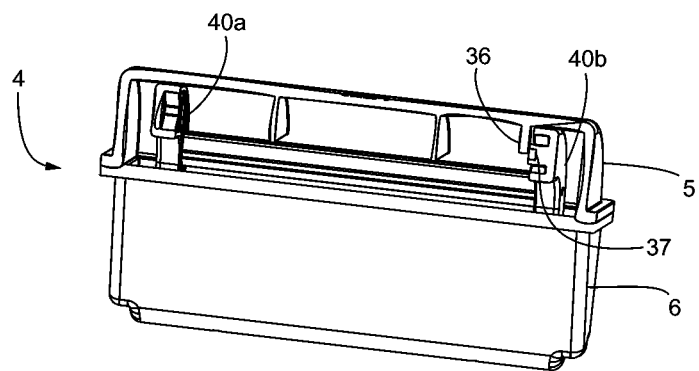
FIG. 17 shows a sectional view of the camera apparatus form FIG. 16.

The embodiments shown in FIGS. 13 to 17 are distinguished in that the sensor mechanism 16 is disposed inside the carrier housing 4, and is attached to the carrier housing 4, wherein a movement of the handle 15" from the standby position into the actuation position activates the sensor mechanism 16. The actuation position activating the sensor mechanism 16 is shown in FIG. 14. In accordance with FIGS. 13 to 15, the sensor mechanism 16 is designed as a micro-switch 32 coupled to the control mechanism 11. This micro-switch 32 is attached to a receiver 33, formed on the inner surface of the carrier housing 4, or the cover 5, respectively. The micro-switch 32 can either be screwed into the receiver 33, or it can be retained in the receiver 33 via a clip connection, wherein other attachment means are also conceivable. The receiver 33, with the micro-switch 32 secured therein, is disposed next to the movement path of the pivot arm 40b. The pivot arm 40b has an actuation attachment 34, which triggers the micro-switch 32 when the handle 15" is moved into the actuation position, in that the actuation attachment 34 presses on a button element of the micro-switch 32. It is shown in FIG. 15 that the actuation attachment 34 sticks out to the side of the pivot arm 40b, such that when the handle 15" is moved, the actuation attachment 34 is moved toward the micro-switch 31, and comes to bear on the button element, which results in an activation of the micro-switch 32. Thus, in the embodiments shown in FIGS. 13 to 15, a triggering through applying a pressure force to the handle 15" is illustrated, by means of which the button element of the micro-switch 32 is displaced and activated. The embodiment shown in FIGS. 16 and 17 has a comparable functionality, where here as well, the pivot arm 40b is moved through actuation of the handle 15", wherein the actuation is a pressure force applied to the handle 15" by a user, which pushes the handle 15" into the carrier housing 4, as is indicated by way of example by the arrow 35 in FIG. 16, and for the previously described embodiment in FIG. 14. In contrast to the embodiment shown in FIGS. 13 to 15, with the embodiment according to FIGS. 16 and 17, the sensor mechanism 16 is designed as a Hall sensor 36. The Hall sensor 36 is coupled to the control mechanism 11 via a line connection, not shown here. The Hall sensor 36 is disposed in the carrier housing 4 such that the magnet 37 attached to the one pivot arm 40*b* can move in relation to the Hall sensor 36, and triggers a movement of the pivot arm 40*b* as a result of a movement of the handle 15" into the actuation position of the Hall sensor 36. More precisely, the Hall sensor 36 is disposed on the inside of the cover 5, or the carrier housing 4, respectively, such that it is stationary in relation to the magnets 37, while on the other hand, the magnet 37 is disposed in the moveable pivot arm 40*b*, such that a movement of the pivot arm 40*b* as a result of an actuation by a user moves the magnets 37 toward the Hall sensor 36, such that the Hall sensor 36 senses the field generated by the magnets 37. As a result of the sensing, a corresponding signal is transmitted to the control mechanism 11, whereupon the hatchback 2 is unlatched.

It should be noted that lines to the motor for the drive unit 8 and the camera unit 9 are guided in the handle 15, 15', 15", and on the side in a pivot arm 40*a* or 40*b*, in order to be guided out of the pivot arm 40*a*, 40*b* in regions that define a respective bearing 38*a*, 38*b* for the pivot arms, and to be connected in the vehicle interior to the wiring harness of the motor vehicle 1.

Figure 18:
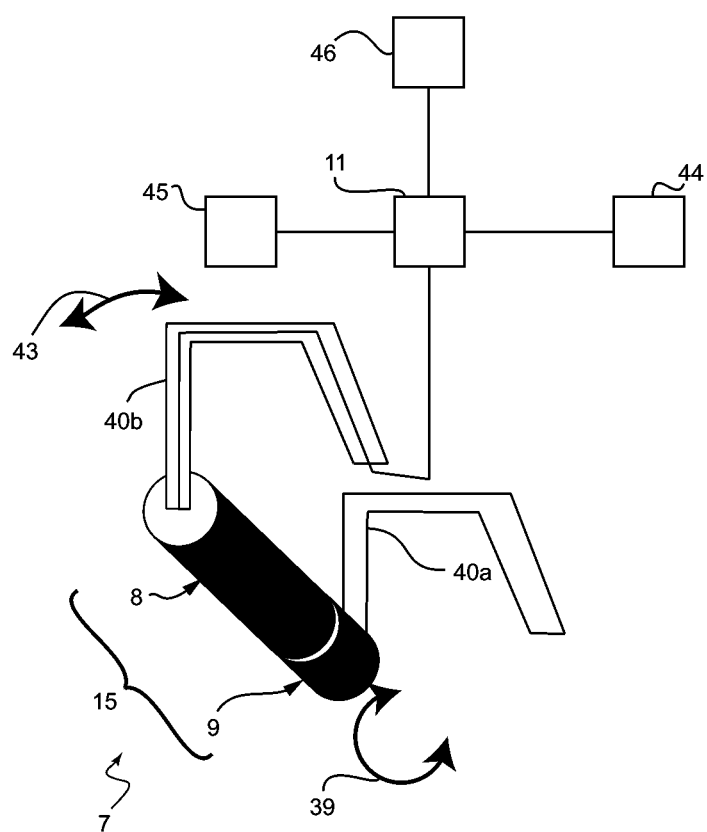
FIG. 18 shows in a schematic manner, the camera apparatus and its coupling to the control mechanism.

FIG. 18 shows, in a schematic depiction, the coupling of the camera apparatus 9, or the camera module 7, respectively, to the control mechanism 11. In this depiction, a cylindrical handle 15 is depicted, which is formed, as a representative of at least the embodiments in FIGS. 13 to 17, from a rotating section of the camera unit 9 and a non-rotatable section of the drive unit 8. Bearings are disposed in the rotational axis 12 of the camera unit 9, which hold the handle 15 on the pivot arms 40*a*, 40*b*. The arrow 39 indicates the rotational direction of the camera unit 9, the arrow 43 represents the pivot movement of the handle 15 when the handle is actuated, when pressure is applied to the handle 15 from below. A wiring harness is guided through the pivot arm 40*b*, which guides the supply lines for the drive unit 8 of the camera module 7, as well as the signal lines for the image signal from the camera unit 9. In this exemplary embodiment, which acts as a representative for FIGS. 5 to 12, it is furthermore provided that the sensor mechanism 16, such as the capacitive sensor system 17, is disposed in the handle 15, in the non-rotatable section 8. The signals of this sensor system 17 are also conducted through lines in the pivot arm. Capacitive sensor systems are known in the field of door handles for motor vehicles, and sense the proximity or touch of a user, e.g. the proximity of the hand of a user. The integration in the camera assembly according to the invention, as components of the handle, enables a more flexible implementation of the assembly. It may be provided, for example, that the camera module 7 is activated as a function of the signals from the capacitive sensor system. If, for example, a hand approaches the handle having a capacitive sensor, and if the camera is in the exposed position for recording, then, in order to protect the camera lens, a rotation of the camera lens into a protected position can be triggered by the control mechanism. Otherwise, the capacitive sensor system can implement the typical functions of the keyless entry functions of a vehicle. The wiring harness from the camera apparatus 3 functioning as a handle, is coupled to the control mechanism 11 in the motor vehicle 1. The camera apparatus 3 is coupled to the cable network or bus system of the motor vehicle 1. A voltage supply 44 provides the operating voltage for powering the drive unit 8 in the handle section. A central vehicle control mechanism 45 receives the image signals from the camera unit 9, and an access control mechanism 46 receives the signals for the handle actuation. In other designs, the control mechanism 11 can also be integrated with further components, e.g. the access control mechanism or the central vehicle control mechanism.

The integration of a sensor mechanism with the rotatable camera allows for the assembly to be designed as a compact assembly, that can be easily installed, which saves time during the installation, and allows for numerous functions through the coupling of the assembly to the wiring harness of the vehicle.

Based on the depicted exemplary embodiments, it is clear that the camera module 7 fills both a role as a section of a handle 15, but also, when the handle is in the standby position, can be pivoted into a recording position, in order to record a region in the surroundings of the motor vehicle 1. The cylindrical design of the handle 15 shown in the example, and the rotatability of the camera unit 9 enable a robust handle to be made accessible at any time. Even in the case that, due to technical problems, e.g. the camera unit 9 can no longer be moved, an actuation of the handle 15 would not be impaired. The integration of both the handle function as well as the camera function also reduces the requirements regarding the installation space, and enables a quick and multifunctional arrangement of numerous components in a receiving space in the auto body.

Figure 2:
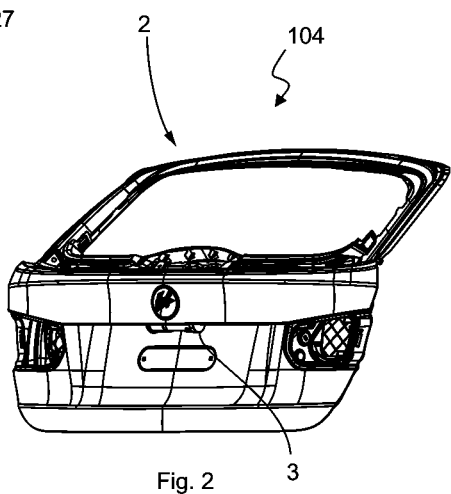
FIG. 2 shows a perspective view of a hatchback with the camera apparatus according to the invention.

A paneling part, which is still shown in FIG. 2, and partially covers the reverse driving camera apparatus 3 there, is left out, in order to enable a view of the reverse driving camera apparatus 3. The reverse driving camera apparatus 3 according to Claim 4 also belongs to the hatchback 2 for a hatchback system 104 of the vehicle 1 (see, e.g. FIG. 1), wherein the hatchback 2 is rotatably attached to the motor vehicle 1 by means of a drive 105 schematically indicated in FIG. 1, such that the hatchback 2 can be automatically mechanically (e.g. by a spring system, which pivots the hatchback 2 upward after it has been unlatched) and/or with a motor, moved from a closed position, in which it is disposed and latched, as shown in FIG. 1, into an open position, in which it is unlatched and pivoted upward. FIGS. 20 to 29 show a reverse driving camera apparatus 3, which differs from the reverse driving camera apparatus 3 in FIGS. 5 to 19 in that a distance detection means is provided, which is intended for preventing the hatchback from colliding with a garage ceiling, for example. This reverse driving camera apparatus 3 having distance detection means, is shown in greater detail in FIGS. 20 to 29, as shall be explained below. The reverse driving camera apparatus shown in FIGS. 20 to 29 is an embodiment that differs from the camera apparatus in FIG. 18 by the features described below. The reverse driving camera apparatus 3 likewise comprises a carrier housing 4, which is disposed on the hatchback, or on the moveable vehicle part 2 of the motor vehicle 1, and is attached there such that it can be pivoted in relation to the motor vehicle, together with the hatchback 2. The carrier housing 4 has a two part design, in turn, and comprises a cover, which is laser welded to the bottom part. Furthermore, the reverse driving camera apparatus 3 comprises a camera module 7, which is also moveable in relation to the carrier housing 4. The camera module 7 has a drive unit 8, and a camera unit 9, having a camera lens 10. The camera unit 9 can move thereby, by means of the drive unit 8, into a standby position (see FIG. 21), in which it is retracted into the carrier housing 4, and is protected, and into an extended position (see FIG. 22), in which it is disposed protruding from the carrier housing 4. It is also conceivable, in accordance with an alternative variation, that only the camera unit 9 can be moved into the standby position and the extended position, while in contrast, the drive unit 8 is disposed such that it is stationary and immobile with respect to the carrier housing 4. The carrier housing 4 is thus attached to the moveable vehicle part 2 on the vehicle 1, and does not change its position in relation to this vehicle part 2, but rather, executes its movement together therewith.

The camera unit 9 with the camera lens 10 is disposed axially to the drive unit 8 in the carrier housing 4. Both the camera unit 9 as well as the drive unit 8 are coupled to pivot arms 40a, 40b, and disposed between the pivot arms 40a, 40b. The pivot arms 40a, 40b are hinged to the carrier housing 4 at their lower ends. Furthermore, the pivot arms 40a, 40b are tensioned against the carrier housing 4 by means of spring elements, or elastic reset means 41a, 41b, such that the pivot arms 40a, 40b force the camera unit 9, or the camera module 7, respectively, into the standby position according to FIG. 21. When in the standby position, the camera unit 9 and the drive unit 8 lie at least in part in a receiving space 116 of the carrier housing 4 (see, e.g. FIG. 21). As can be derived, in particular, from FIG. 20, the camera unit 9 has a tubular design, wherein the drive unit 8 also has a tube-shaped housing. The camera unit 9 and the drive unit 8 thus form a tube-shaped assembly, which extends between the pivot arms 40a, 40b, and can be pivoted out of the carrier housing 4 collectively, by means of the pivot arms 40a, 40b. When in the standby position, the camera module 7, and in particular the camera lens 10, points toward the interior of the vehicle, or the interior of the carrier housing 4, and is disposed such that it is protected from external effects. Furthermore, a bridge 106a attached to the carrier housing 4 is visible, which can also be referred to as a support means 106a. The function of the bridge 106a shall be explained below.

Figure 21:
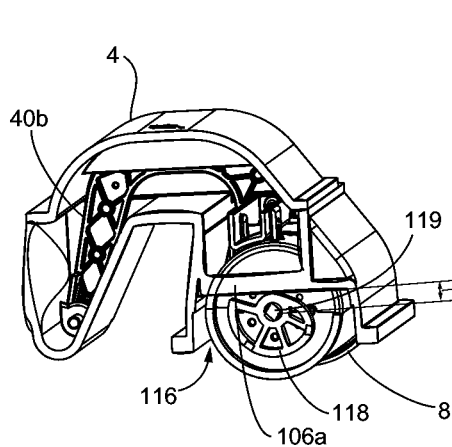
FIG. 21 shows a perspective, lateral, sectional view of the reverse driving camera apparatus, with a camera unit in the standby position.
Figure 22:
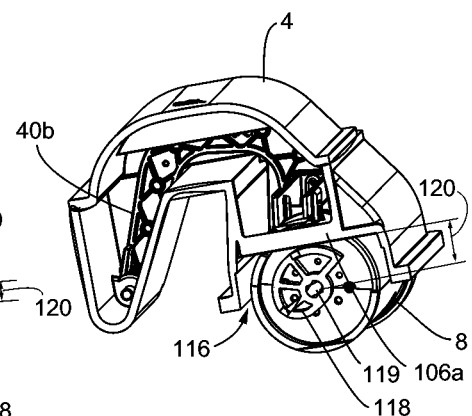
FIG. 22 shows a perspective, lateral, sectional view of the reverse driving camera apparatus, with the camera unit in the extended position.

FIGS. 21 and 22 illustrate the mobility of the camera module 7 between the standby position (FIG. 21) and the extended position (FIG. 22). It can be seen that both the camera unit 9 as well as the drive unit 8 are disposed such that they are pivoted outward in relation to the carrier housing 4, by means of the pivot arms 40a, 40b. Furthermore, it can be seen that the camera module 7 is also rotated, in addition to the pivoting from the standby position into the extended position. When in the extended position, it is possible for the camera lens 10 to obtain a better range of vision than when in the standby position.

Figure 4:
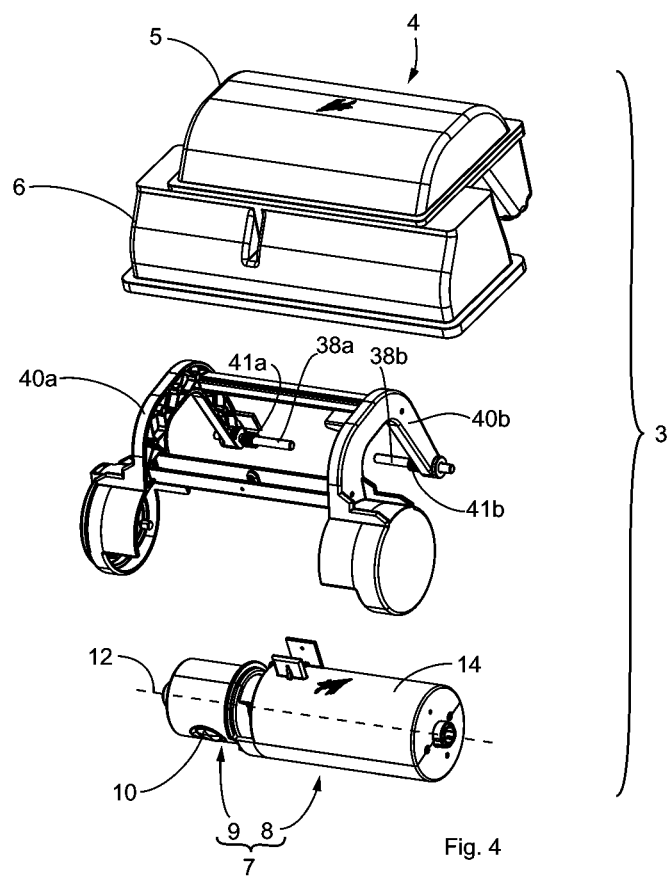
FIG. 4 shows a perspective detail view of the camera apparatus according to the invention from FIG. 3.

The overview of FIG. 4 (this also applies to the exemplary embodiment having distance detection means, referred to above), and FIGS. 21 and 22, shows that the camera unit 9 is disposed axially to the drive unit 8 on the pivot arms 40a, 40b. The bearings for the pivot arms 40a, 40b, having the spring pretension of the reset means 41a, 41b in the lower region of the pivot arms 40a, 40b are also visible in FIGS. 21 and 22. The drive unit 8 has a tube-shaped covering, or a tube-shaped housing 14, in which a motor and a drive unit are accommodated, which are not shown in greater detail in the Figures. It should be noted that the motor drives the camera unit 9 with a transmission gear ratio. Furthermore, an eccentric component 118 can be seen in FIGS. 21 and 22, which interacts with the bridge 106a when installed, as shall be described further below. The eccentric component 118 is thus rotated together with the camera unit 9, and bears on the bridge 106a, in order to cause the pivoting outward of the camera unit 9 into the extended position, shown in FIG. 22. The drive and the transmission thus provide the rotational movement of the camera unit about an adjustment axle 119, as well as the outward pivoting of the pivot arms 40a, 40b with respect to the carrier housing 4.

Figure 20:
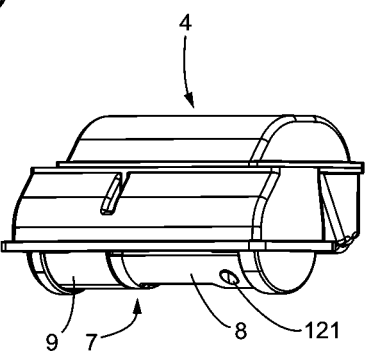
FIG. 20 shows a perspective view of the reverse driving camera apparatus according to the invention, according to Claim 1.

In addition to the standby position shown in FIG. 21, in which the camera unit 9 is rotated such that the camera lens 10 is oriented toward the inside of the carrier housing 4, and protected against external effects, there is also at least the extended position shown in FIG. 22, for the reverse driving camera apparatus 3. The standby position for the camera unit 9 is activated when the camera lens 10 is not needed. This can be the case, for example, when the motor vehicle 1 is used at higher speeds while driving forwards. Due to the rotatability of the camera unit 9, various recording positions are conceivable, such that, if necessary, the driver can vary the position of the camera lens 10, or can select the position thereof, depending on the position of the moveable vehicle part 2, when the camera unit 9 is in the extended position. When in this extended position of the camera module 7, or the camera unit 9, the camera lens 10 and the drive unit 8 are pivoted at least partially out of the receiving space 16 in the carrier housing 4. FIGS. 21 and 22 each show a section through the assembly that is shown in FIG. 20. It is visible from the respective sectional views that the eccentric component 118 bears on the support means 106a of the carrier housing 4. In contrast to the standby position, in which the eccentric component 118 is rotated such that the circumferential region of the eccentric component 118 bears on the bridge 106a of the carrier housing 4 with a minimal radius, in the extended position of the camera module 7, shown in FIG. 22, the eccentric component 118 is rotated approx. 180°.

With respect to the sectional views of FIGS. 21 and 22, the eccentric component 118 is moveably coupled to a rotating shaft of the motor for the drive unit 8, via the adjustment axle 119, wherein the camera unit 9 is also coupled to the rotating shaft via the adjustment axle 119. Furthermore, the eccentric component 118 can be rotated about the adjustment axle 119. Thus, the rotating shaft can be moveably coupled directly to the adjustment axle 119, or alternatively, it can be moveably coupled to the adjustment axle 119 via a transmission. The important thing is that the rotating shaft and the adjustment axle 119 ensure that both the camera unit 9 and the eccentric component 118 can be rotated about the adjustment axle 119. It is clear that when the eccentric component 118 is rotated, different support and spacing of the adjustment axle 119 to the support means 106a are obtained, depending on the angle of rotation. When the eccentric component 118 is rotated—starting from the standby position—a section of the outer circumference of the eccentric component 118 having a greater radial spacing to the adjustment axle 119, ends up bearing on the support means 106a. This pushing away of the eccentric component 118 with the adjustment axle 119 from the support means 106a causes the pivoting of the pivot arms 40a, 40b in relation to the carrier housing 4. In this manner, the extension movement of the camera module 7, or at least the camera unit 9, is caused in a synchronized manner by the drive unit 8, which drives the adjustment axle 119. Through the effect of the eccentric component 118, at the same time as the rotation, a simultaneous outward pivoting can thus be caused through activating the camera unit 9. An outward pivoting defined by the shape of the eccentric component is assigned to each rotational position of the camera unit 9, wherein the camera lens 10 can have a rotational range of approx. 200°.

The design shown in FIGS. 2 and 19 to 22 is merely a preferred design, in which, using a single drive unit 8, both the rotation of the camera lens 10 in order to improve the recording position, as well as an extension movement, from the standby position into the extended position, thus an active position, are implemented. According to the invention, accordingly, the camera unit 9 is supported such that it can rotate about the adjustment axle 119 coupled to the drive unit 8 with respect to the carrier housing 4, and can be moved through rotation about the adjustment axle 119, between the standby position and the extended position. The eccentric component 118 is moveably coupled to the adjustment axle 119 thereby. The eccentric component 118 is supported on the support means 106a of the carrier housing 4, such that a rotation of the eccentric component 119 alters the spacing 120 of the adjustment axle 119 to the support means 106a, such that the camera unit 9 can be moved into the extended position, in which the camera unit 9 protrudes out of the carrier housing 4. It is understood that the adjustment axle 119 can be coupled to the carrier housing 4 via at least one pivot arm 40a or 40b, wherein the camera unit 9 can be moved into the extended position in relation to the carrier housing 4 via the adjustment axle 119 and the at least one pivot arm 40a or 40b. Likewise, it is understood that the at least one pivot arm 40a, 40b is tensioned against the carrier housing 4 with elastic reset means 41a, 41b, such that the at least one pivot arm 40a, 40b forces the camera unit 9 into the standby position. Furthermore, the drive unit 8 for the camera module 9 is also disposed in the adjustment axle 119, wherein the drive unit 8, together with the camera unit 9, can be pivoted via the at least one pivot arm 40a, 40b, from the standby position into the extended position, and back.

It is characteristic of the invention that the camera module 7, or alternatively, just the camera unit 9, is disposed, at least during the opening movement of the hatchback 2, in the extended position. When in the extended position, it is checked using the camera module 7, whether an obstacle 112 is disposed in the movement path 129 of the hatchback 2, and there is the danger of a collision of the hatchback 2 with the obstacle 112 (see, e.g., FIGS. 26 to 29). With regard to this function of the camera module 7, the invention provides that the camera module 7 has at least one distance detection means 121. The distance detection means 121 determines a spacing 122 (see, e.g., FIGS. 28 and 29) between the hatchback 2 and an obstacle 112 disposed in the movement path 129 of the pivotable hatchback 2, which can be, e.g., a person or the ceiling of a garage.

Figure 23:
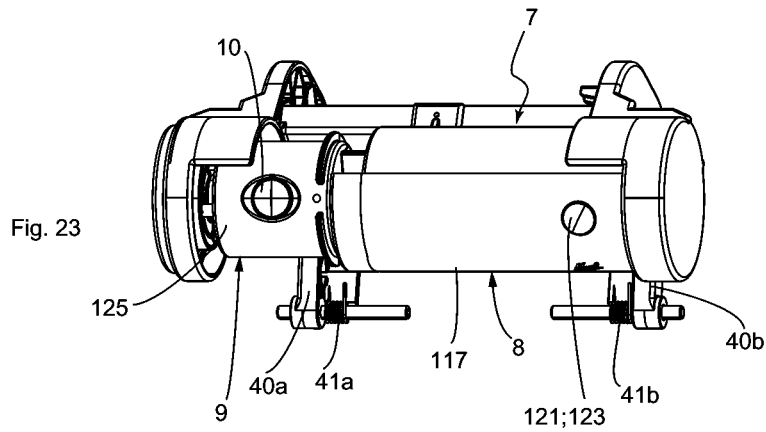
FIG. 23 shows a perspective view of the camera unit with a distance detection means in accordance with a first embodiment.
Figure 24:
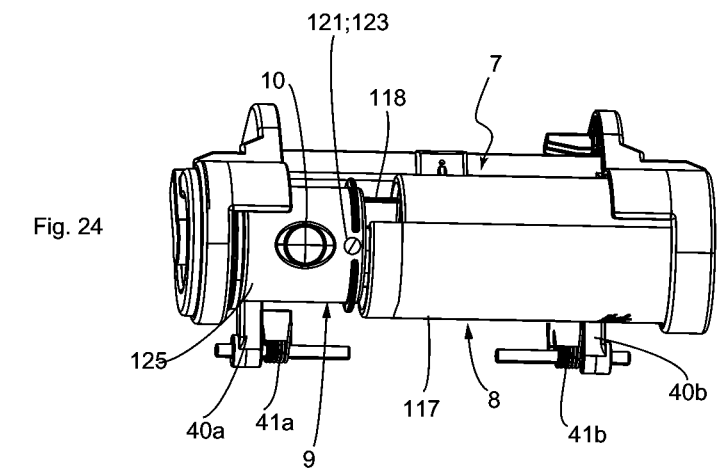
FIG. 24 shows a perspective view of the camera unit, with a distance detection means in accordance with second embodiment.
Figure 25:
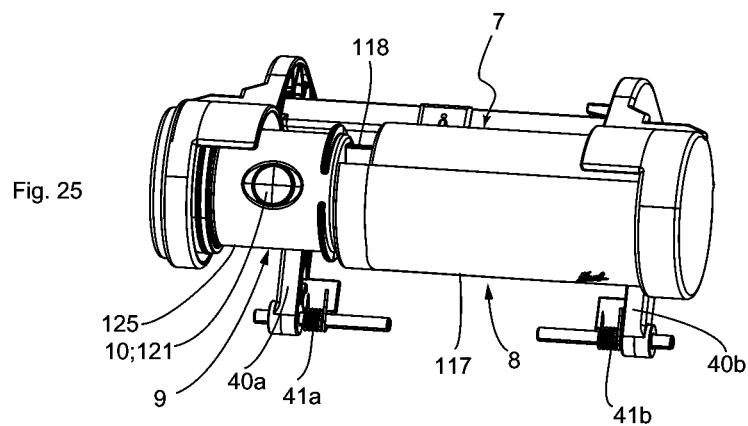
FIG. 25 shows a perspective view of the camera unit, with a distance detection means in accordance with a third embodiment.

FIGS. 23 to 25 show various embodiments of a distance detection means 121. In FIGS. 23 and 24, the distance detection means 121 is designed as an ultrasound sensor unit 123, from which ultrasound waves are emitted. If these ultrasound waves 124 (see, e.g., FIGS. 28 and 29) strike an obstacle, then an echo is generated by the obstacle, which in turn is received by the ultrasound sensor unit 123. The distance between the sensor and the obstacle is then determined via the so-called echo-delay method. The determined distance can be indicated to the driver of a motor vehicle 1 by means of an acoustic and/or optical signal, wherein this signal can only then be displayed when a pre-defined safety spacing is not met. With the embodiment shown in FIG. 23, the distance detection means 121 designed as an ultrasound sensor unit 123 is accommodated in the housing 14 for the drive unit 8. The housing 14 has sufficient space for accommodating the ultrasound sensor unit 123 in addition to the motor, and, if applicable, the transmission. FIG. 24 shows an alternative arrangement of the ultrasound sensor unit 123, which is accommodated in the housing 124 for the camera unit 9 here. Alternatively, the use of at least two ultrasound sensor units 123 is conceivable, of which one is accommodated in the housing 14 for the drive unit 8, and the other is accommodated in the housing 125 for the camera unit 9. Likewise, it is conceivable that an ultrasound sensor unit 123 is not accommodated in either the housing 14, or in the housing 125, but rather, in its own housing, intended for this, which is supported on the adjustment axle 119. It is also possible to use numerous ultrasound sensor units 123 as distance detection means 121.

According to the embodiment shown in FIG. 25, it is also conceivable that the distance detection means 121 is the camera lens 10 of the camera unit 9. The images recorded by the camera lens 10 in the viewing range (see the broken lines in FIGS. 26 to 29) must be evaluated accordingly thereby, in order to detect an obstacle 112 disposed in the movement path of the hatchback 2, when the hatchback is pivoted upward.

Independently of the concrete design of the distance detection means 121, it is necessary that the distance detection means 121 is coupled to an evaluation unit 127 (see, e.g., FIG. 1) that compares the determined spacing 122 to a pre-defined safety spacing 126 (see FIGS. 28 and 29), which is designed such that is emits a signal to the drive 105 for stopping the movement of the hatchback, when the safety spacing 126 is not met.

FIGS. 26 to 29 show various situations for the hatchback 2 with the camera module 7 according to the invention, which includes the distance detection means 121. It is insignificant thereby, for the depictions in FIGS. 26 to 29, whether the distance detection means 121 is the camera unit 9, or is designed as an ultrasound sensor unit 123, because the functioning for both designs is identical. It is likewise insignificant whether the ultrasound sensor unit 123 is accommodated in the housing for the drive unit 8 or in the housing 125 for the camera unit 9. In FIG. 26, the camera module 7 is in the standby position, because the hatchback 2 of the motor vehicle 1 is latched, or locked, respectively. In contrast, in FIG. 27, an opening movement of the hatchback 2 occurs, wherein the hatchback 2 is unlatched prior to this. The distance detection means 121 does not determine the presence of an obstacle 112, because the obstacle is not in the movement path 129 of the hatchback 2. In FIG. 27, the hatchback 2 is pivoted upward approx. 5°, and the camera module 7 is in the extended position. It may be provided thereby that the camera unit 9 of the camera module 7 is disposed, at the latest, in the extended position, when, during the opening movement, the moveable vehicle part, or the hatchback 2, is rotated a maximum of 5° about a point of rotation 128 on the motor vehicle 1. Neither the camera lens 10, nor the distance detection means 121 determine the presence of, and sense an obstacle 112 in FIGS. 26 and 27, which is currently disposed in the movement path 129 of the hatchback 2, and is at a spacing to the hatchback 2, which falls below a pre-defined safety spacing 126. In contrast, in FIG. 28 the hatchback 2 is pivoted up to 90°, and fully opened. The distance detection means 121 determines the presence of an obstacle 112 in this position, which, however, is disposed at a spacing 122 to the hatchback 2, which is greater than the predefined safety spacing 126. In contrast, FIG. 29 shows a situation, in which an obstacle 112 is at a spacing 122 to the hatchback 2, which falls below the pre-defined safety spacing 126. In the situation depicted in FIG. 29, there is the danger that the hatchback 2 will collide with the obstacle 112 (a ceiling to a garage). In this situation, the hatchback 2 is opened, but it is pivoted less than 90° about the point of rotation 128. Instead, it is ensured that the pivotal movement of the hatchback 2 is immediately prevented and blocked, when the predefined safety spacing 126 is not met, as is shown in FIG. 29. By way of example, the drive 105 is blocked, in order to prevent the hatchback 2 from being pivoted upward further. In this manner, it is securely prevented that the hatchback 2 collides with the obstacle 112, and is damaged.

Figure 30:
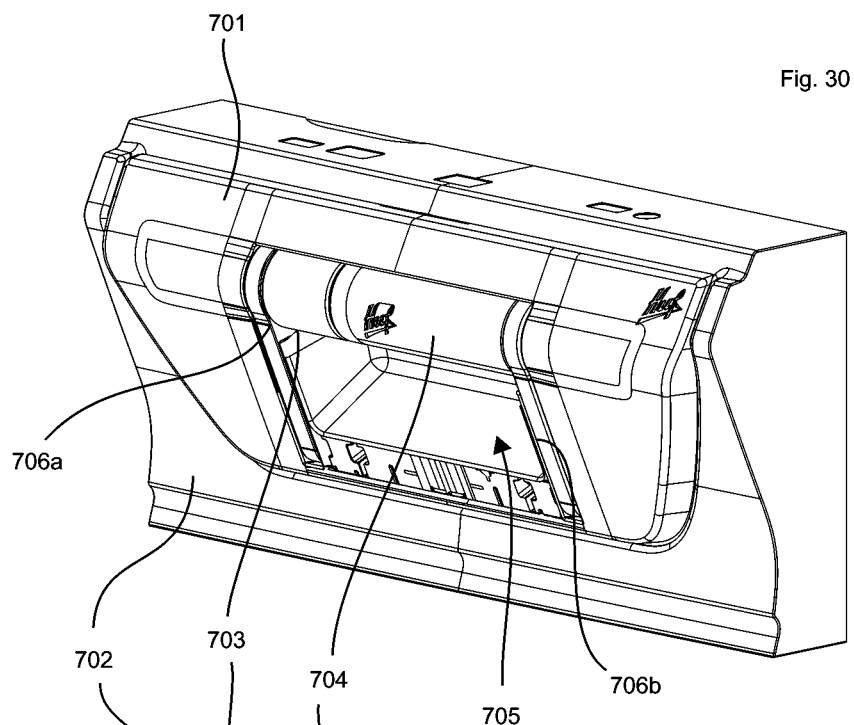
FIG. 30 shows a carrier assembly with a handle and camera integrated therein, in accordance with an exemplary embodiment for the camera apparatus, wherein the camera lens is in a standby position.

Another exemplary embodiment of the invention for a camera unit is shown in FIG. 30, in which the camera lens forms a section of a handle. A carrier assembly 701 is inserted in a recess of an auto body 702 in the rear region of a vehicle. The auto body section 702 is a section of a tailgate for a transport vehicle in this exemplary embodiment, in particular a pick-up.

Figure 31:
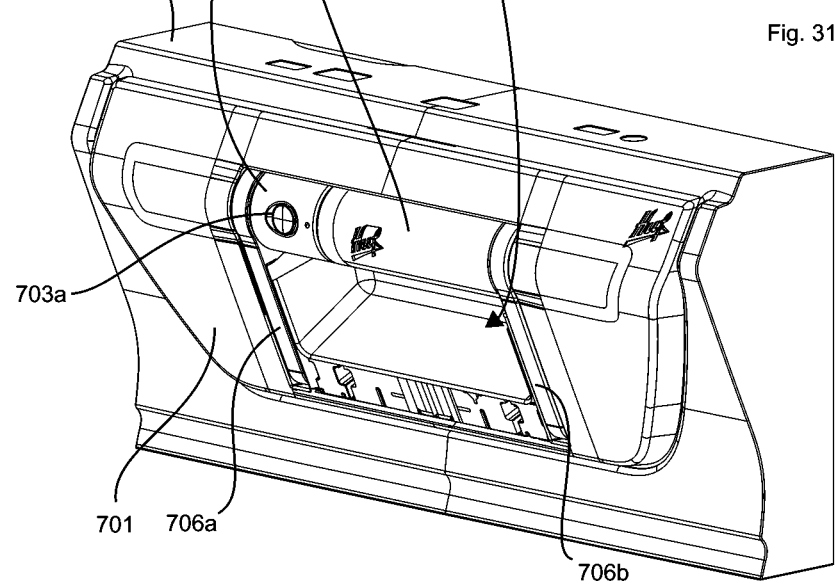
FIG. 31 shows a carrier assembly with a handle from FIG. 30, wherein the camera lens is located in a recording position.

A camera with a camera lens 703 and a drive 704 coupled thereto are disposed in the carrier assembly. The camera lens 703 can be rotated about a camera rotational axis, in order to move the camera out of the standby position shown in FIG. 30, into the recording position shown in FIG. 31. In FIG. 31 it is shown that the camera lens is oriented with a lens 703a toward a region behind the vehicle. The standby position in FIG. 30 protects the lens 703a by rotating the camera lens into a position facing away from the exterior. In contrast, in the position in FIG. 31, it is possible to record the outer region with the camera.

The camera lens 703 as well as the drive 704, including its housing, collectively form a handle in this exemplary embodiment. The handle can be accessed through a handle space 705, which is located in the form of a recess in the carrier assembly 701, beneath the camera lens 703 and the drive 704.

Pivot arms 706a, 706b are disposed on the opposing sides of the handle, thus, on one side, next to the camera lens 703, and on the other side, on the drive unit 704. These pivot arms 706a, 706b allow the handle, with the camera lens 703 and the drive 704, to be pivoted out of the carrier assembly 701, when the handle is grasped and pulled through the access space 705.

Figure 32:
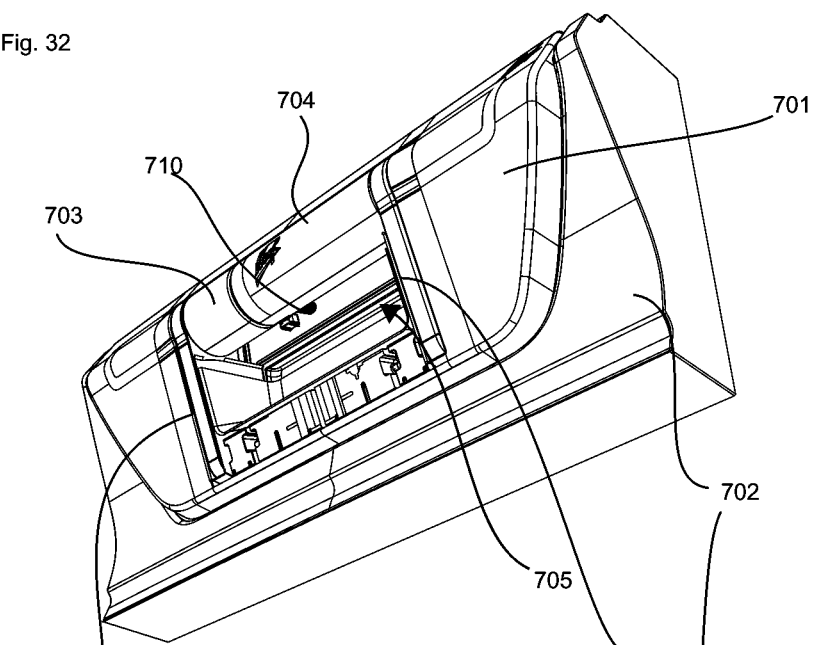
FIG. 32 shows another perspective on the exemplary embodiment from FIGS. 30 and 31.

The access space 705 beneath the handle can be seen more easily in FIG. 32. It is clear that the camera lens 703 as well as the drive 705 can be grasped from below, in order to execute a handle actuation.

Figure 33:
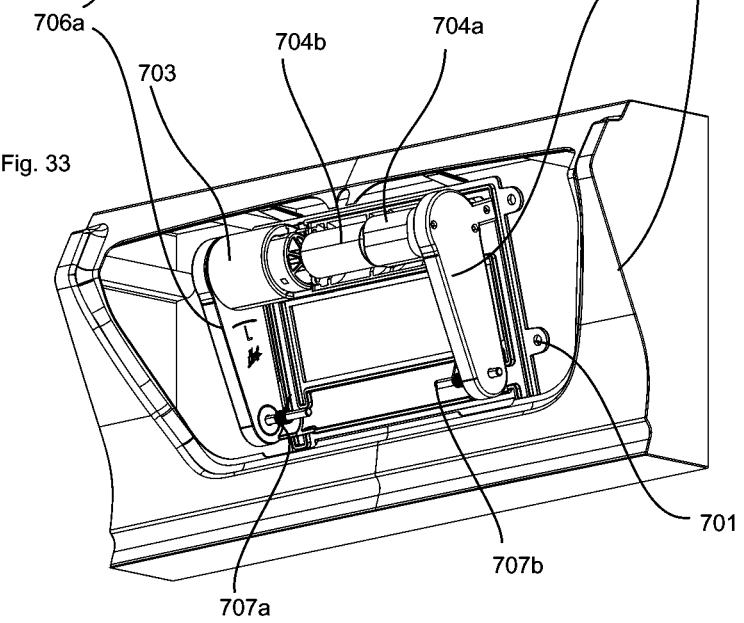
FIG. 33 shows the exemplary embodiment form FIGS. 30 to 32, wherein a part of a cover for the carrier assembly is removed.

A part of the carrier assembly 701 and a cover for the drive 704 are removed in FIG. 33, in order to make the bearing for the pivot arms in spring-loaded bearings 707a, 707b more visible. It is clear that the pivot arms 706a, 706b are subjected to a reset force in the bearings 707a, 707b by spring elements, which force the handle into a standby position, corresponding to the position in FIGS. 30 and 31.

The handle, having the camera lens 703 and the drive element 704 can be pulled out of this standby position by overcoming the reset force in order to actuate the hatch. For this, sensors in the form of micro-switches (not shown) are disposed in the pivot arms 706a, 706b in the region of the bearings 707a, 707b, which detect a movement of the pivot arms.

The drive 704 has an electric motor 704a and a transmission 705b in a housing casing, wherein this housing casing is partially removed in FIG. 33.

Furthermore, a spring element 710 is visible in FIG. 32, which supports the handle with respect to the carrier assembly 701. This spring element ensures that when an impact or pressure is applied to the handle, a displacement of the handle in the carrier assembly is possible. If, for example, the tailgate is pivoted downward, and lies on an obstacle, damage to the camera can be avoided, because this recoils into the carrier assembly by overcoming the spring force of the spring 710.

Lines to the motor 704a and the camera lens 703 are guided in the handle, and at the side, in one of the pivot arms 706a, 706b, in order to exit the pivot arms in the region of the bearings 707a or 707b, and to be connected in the vehicle interior with the wiring harness of the vehicle.

FIG. 34 shows the handle in the pulled-out position, thus in the actuated position. In order to open the hatch or to unlatch a door, the user grasps the handle, which comprises the camera lens 703 and the drive 704, and pulled the handle from the standby position into the depicted actuation position. The sensors in the region of the bearings 707a, 707b detect this actuation, and the hatch or door is unlatched. In the specified example, micro-switches are specified as actuation sensors, but other switches or mechanical actuation elements, in particular Bowden cables and mechanical locking means can be used.

FIG. 35 shows, in a schematic depiction, the coupling of the camera apparatus to a control mechanism.

In this depiction, the cylindrical handle 710 is formed by a rotatable section of the camera lens 711 and a non-rotatable section 712. Bearings are disposed in the rotational axis of the camera lens 711, which retain the handle on the pivot arms 713a, 713b. The arrow 714 indicates the rotational movement of the camera lens 711, the arrow 715 depicts the pivotal movement of the handle 710 when the handle is actuated.

A wiring harness is guided through the pivot arm 713a, which conducts both the power supply for the drive for the camera lens 711, as well as guiding the signal lines for the image signals from the camera lens.

In this exemplary embodiment, it is furthermore provided that a capacitive sensor (not shown) is disposed in the handle, e.g. in the non-rotatable section 712. The signals from this sensor is also guided through the lines in the pivot arm 713a.

Capacitive sensors are known in the field of door handles for motor vehicles, and sense the proximity or touch of a user, e.g. the proximity of the hand of a user. The integration in the camera assembly according to the invention as a component of the handle provides for a more flexible implementation of the assembly. It may be provided, for example, that the camera lens is activated, depending on the signals of the capacitive sensor. If, for example, a hand approaches the handle having a capacitive sensor, and the camera is in the exposed position for recording, then a rotating of the camera lens into a protected position in order to protect the camera lens can be caused by the control mechanism. Otherwise, the capacitive sensor can implement the normal functions of the keyless entry function of a vehicle.

The wiring harness from the camera apparatus having a handle function is coupled to the control mechanism 716 in the vehicle. The camera apparatus is coupled to the cable network or bus system of the vehicle via this control mechanism. A voltage supply 717 provides the operating voltage for powering the drive in the handle section 712. A central vehicle control mechanism 718 receives the image signal form the camera lens and an access control mechanism 719 receives the signals from the handle actuation. In other designs, the control mechanism 716 can also be integrated with further components, e.g. the access control mechanism or the central vehicle control mechanism.

The integration of a capacitive sensor mechanism with the rotatable camera makes it possible to execute the assembly as a compact assembly that is easy to install, which saves time during installation, and enables numerous functions through coupling the assembly to the wiring harness of the vehicle.

Based on the depicted exemplary embodiments, it is clear that the camera lens fulfills both a role as a section of a handle as well as being able to be pivoted into a recording position, when the handle is in the standby position, in order to record a region of the surroundings of the vehicle. The cylindrical design of the handle shown in the example, and the rotatability of the camera, make it possible to provide a robust handle at any time. Even in the case that, due to technical problems, e.g., the camera lens can no longer move, an actuation of the handle is not impaired. The integration of both the handle function as well as the camera function also reduces the requirements regarding installation space, and enables a quick and multifunctional arrangement of numerous components in a recess in the auto body.

When identical reference symbols are used in different embodiments, then these refer to identical or the same elements or components.

The invention described above is, as a matter of course, not limited to the described and depicted embodiments. It is clear that numerous modifications can be made to the embodiments depicted in the drawings, which are obvious to the person skilled in the art, pertaining to the intended use, without abandoning the scope of the invention thereby. Everything contained in the description and/or depicted in the drawings deviating from the concrete exemplary embodiments, including that which is obvious to the person skilled in the art, belongs to the invention.

The invention claimed is:

1. A reverse driving camera apparatus for a motor vehicle, comprising:
   a carrier housing, disposed in a moveable vehicle part of the motor vehicle,
   a camera module, which comprises a drive unit and a camera unit,
   wherein the camera unit is designed such that it can be moved, via the drive unit between a retracted standby position in the carrier housing and an extended position, protruding out of the carrier housing,
   wherein the camera unit is disposed in the extended position, at least during a movement of the vehicle part, and in that the camera module has at least one distance detection means that determines a spacing between the vehicle part and an obstacle disposed in a movement path of the vehicle part, and
   wherein the camera unit is supported such that it can rotate about an adjustment axle coupled to the drive unit, in relation to the carrier housing, and can be moved between the standby position and the extended position through rotation about the adjustment axle, wherein an eccentric component is moveably coupled to the adjustment axle, which bears on a support means of the carrier housing, such that a rotation of the eccentric component alters the spacing of the adjustment axle to the support means, such that the camera unit can be moved into the extended position, in which the camera unit protrudes out of the carrier housing.

2. The reverse driving camera apparatus according to claim 1, wherein the distance detection means is the camera unit.

3. The reverse driving camera apparatus according to claim 1, wherein the distance detection means has at least one ultrasound sensor unit.

4. The reverse driving camera apparatus according to claim 3, wherein the at least one ultrasound sensor unit is accommodated in a housing for the camera unit.

5. The reverse driving camera apparatus according to claim 3, wherein the at least one ultrasound sensor unit is accommodated in a housing for the drive unit.

6. The reverse driving camera apparatus according to claim 1, wherein the adjustment axle is coupled via at least one pivot arm to the carrier housing, wherein the camera unit can be pivoted into the extended position in relation to the carrier housing via the adjustment axle and the at least one pivot arm, and wherein the at least one pivot arm is tensioned against the carrier housing with elastic reset means, such that the at least one pivot arm forces the camera unit into the standby position.

7. The reverse driving camera apparatus according to claim 1, wherein the drive unit for the camera module is disposed in the adjustment axle, wherein the drive unit can be pivoted, together with the camera unit, from the standby position into the extended position and back, via the at least one pivot arm.

* * * * *